J. E. W. GREVE.
CALCULATING MACHINE.
APPLICATION FILED DEC. 12, 1916.
1,247,954.
Patented Nov. 27, 1917.
18 SHEETS—SHEET 4.
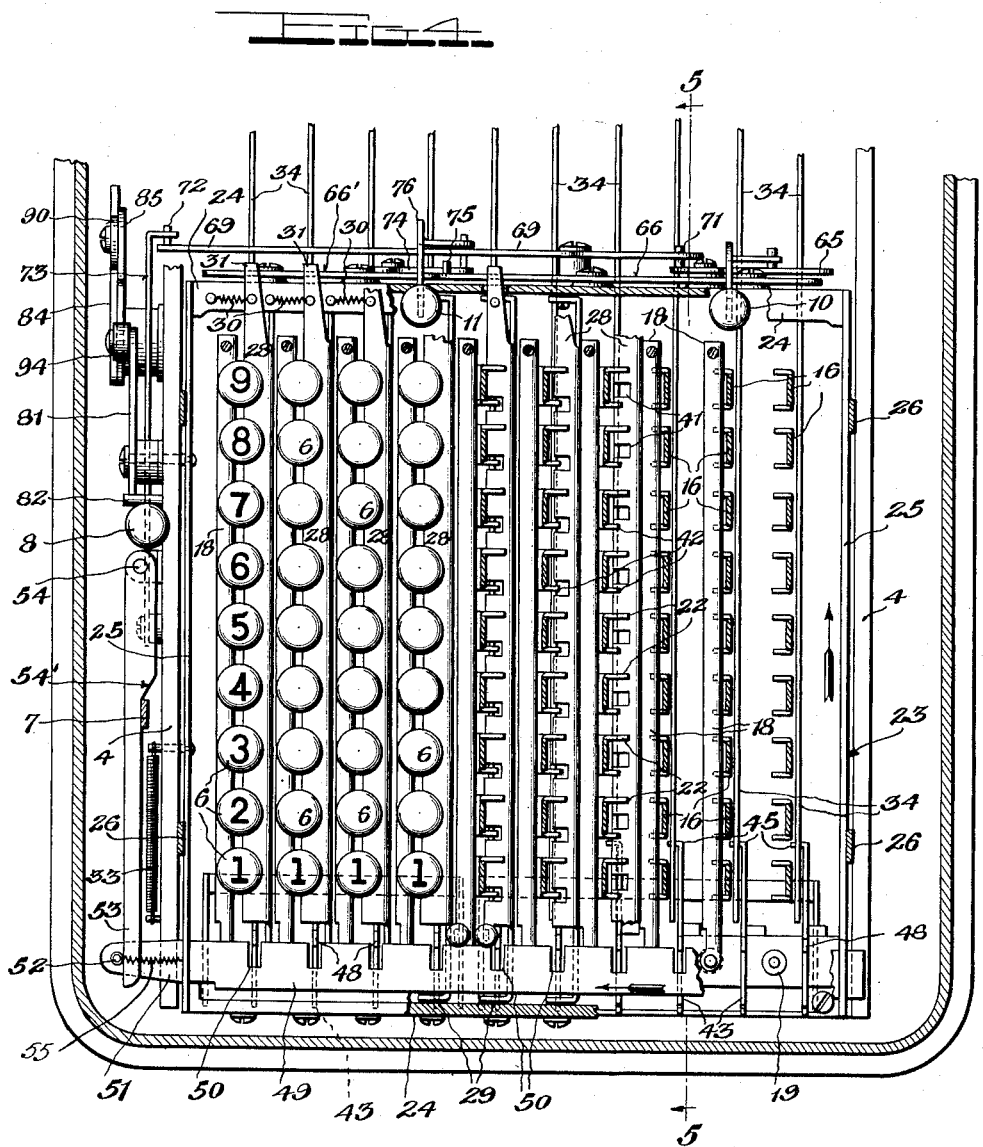
Witness
Chas. L. Griesbauer.
Inventor
John E. W. Greve,
By
Attorney

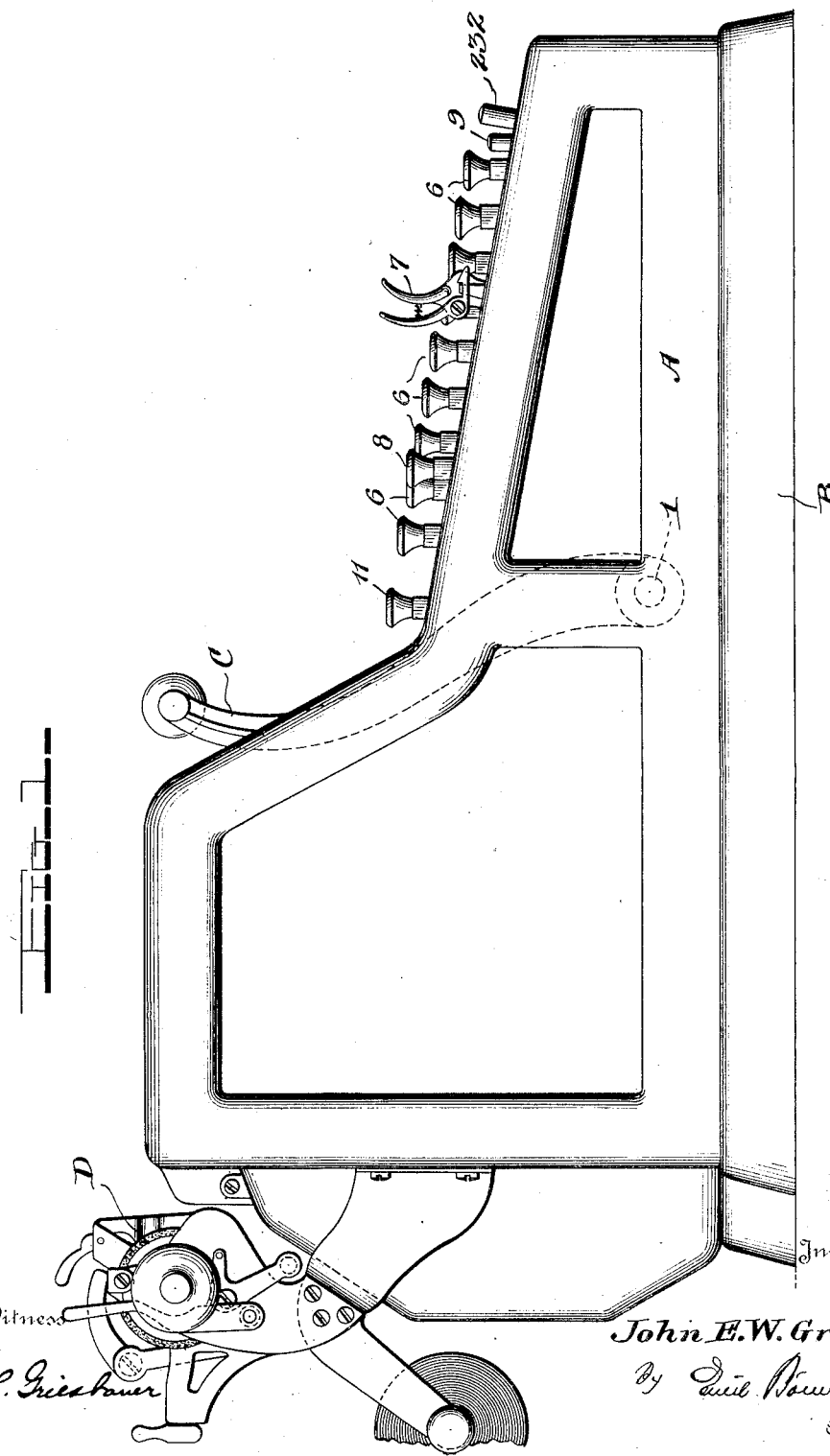

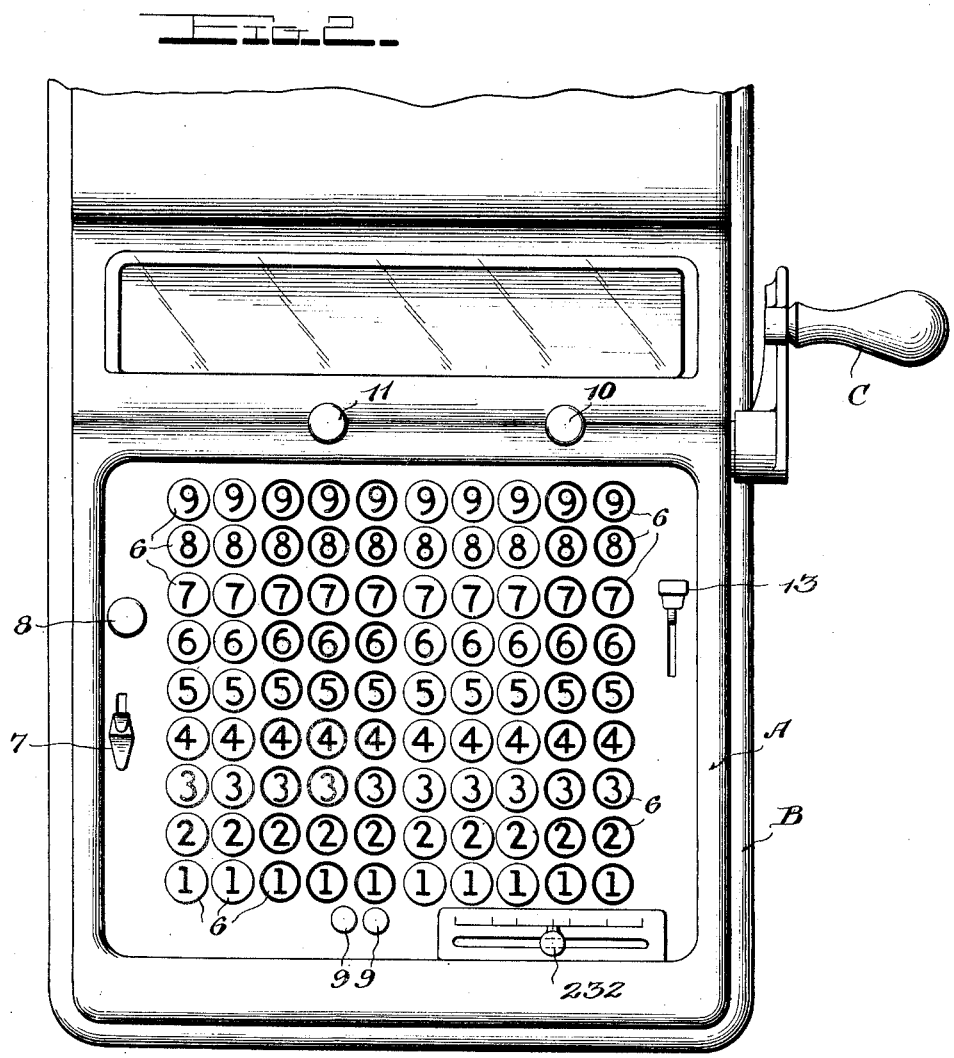

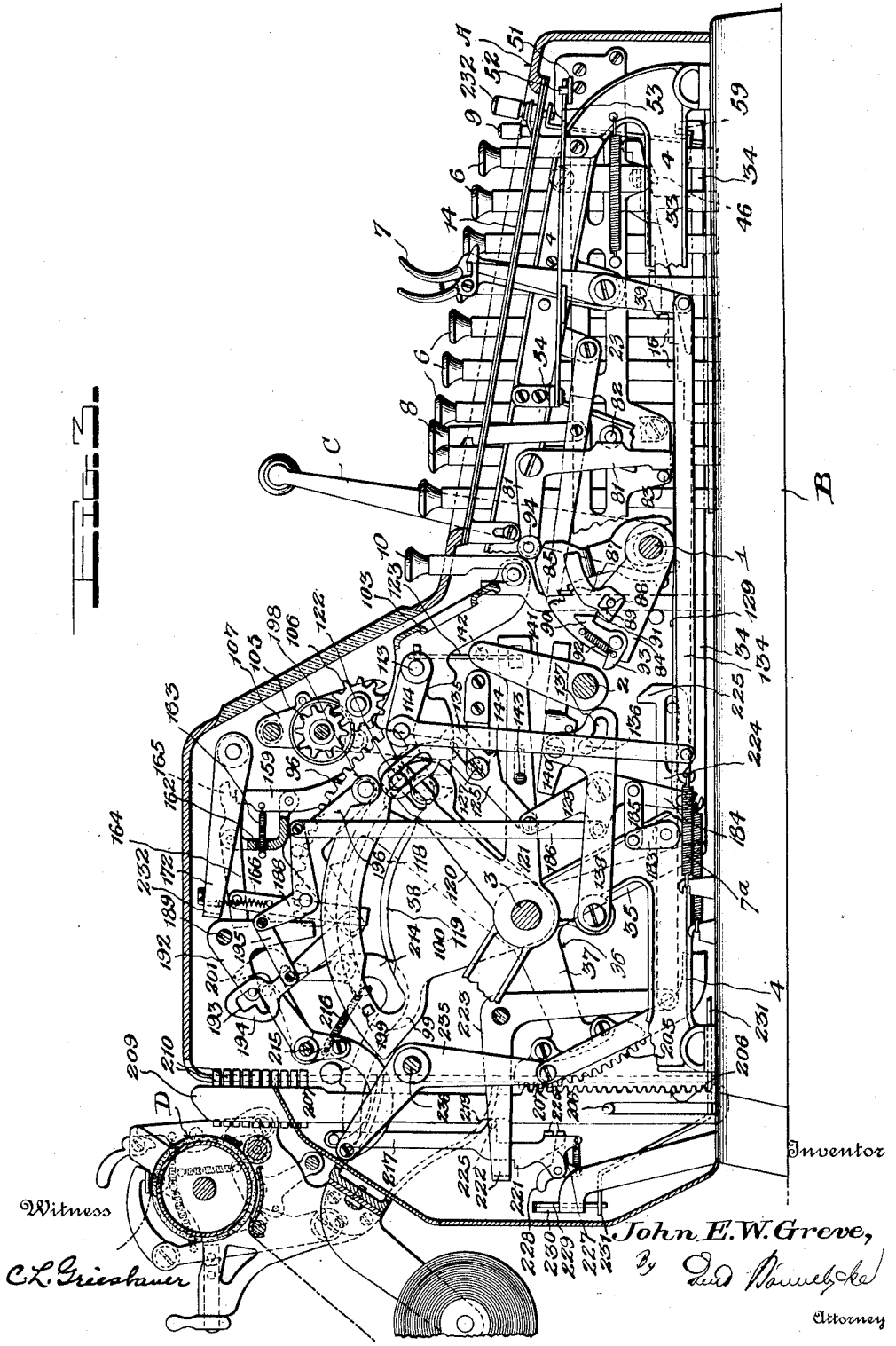

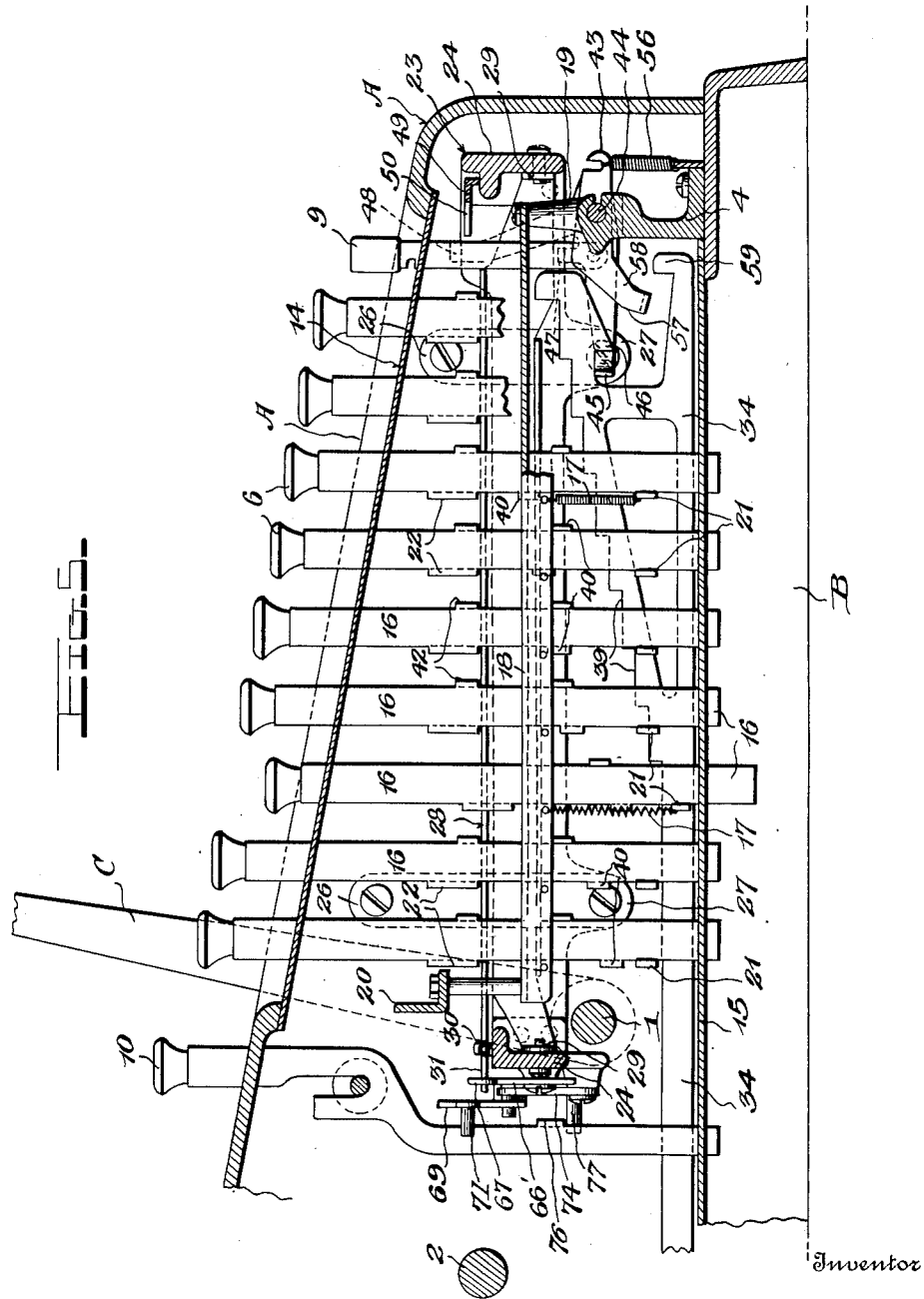

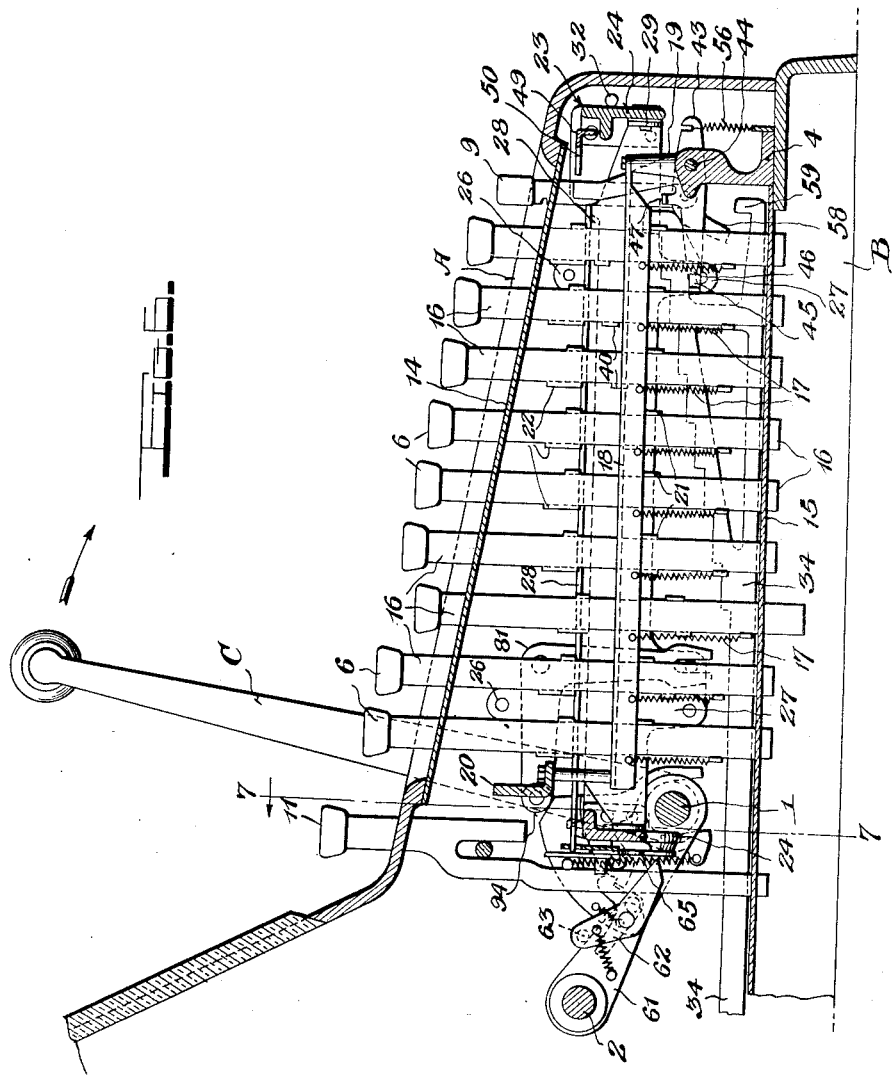

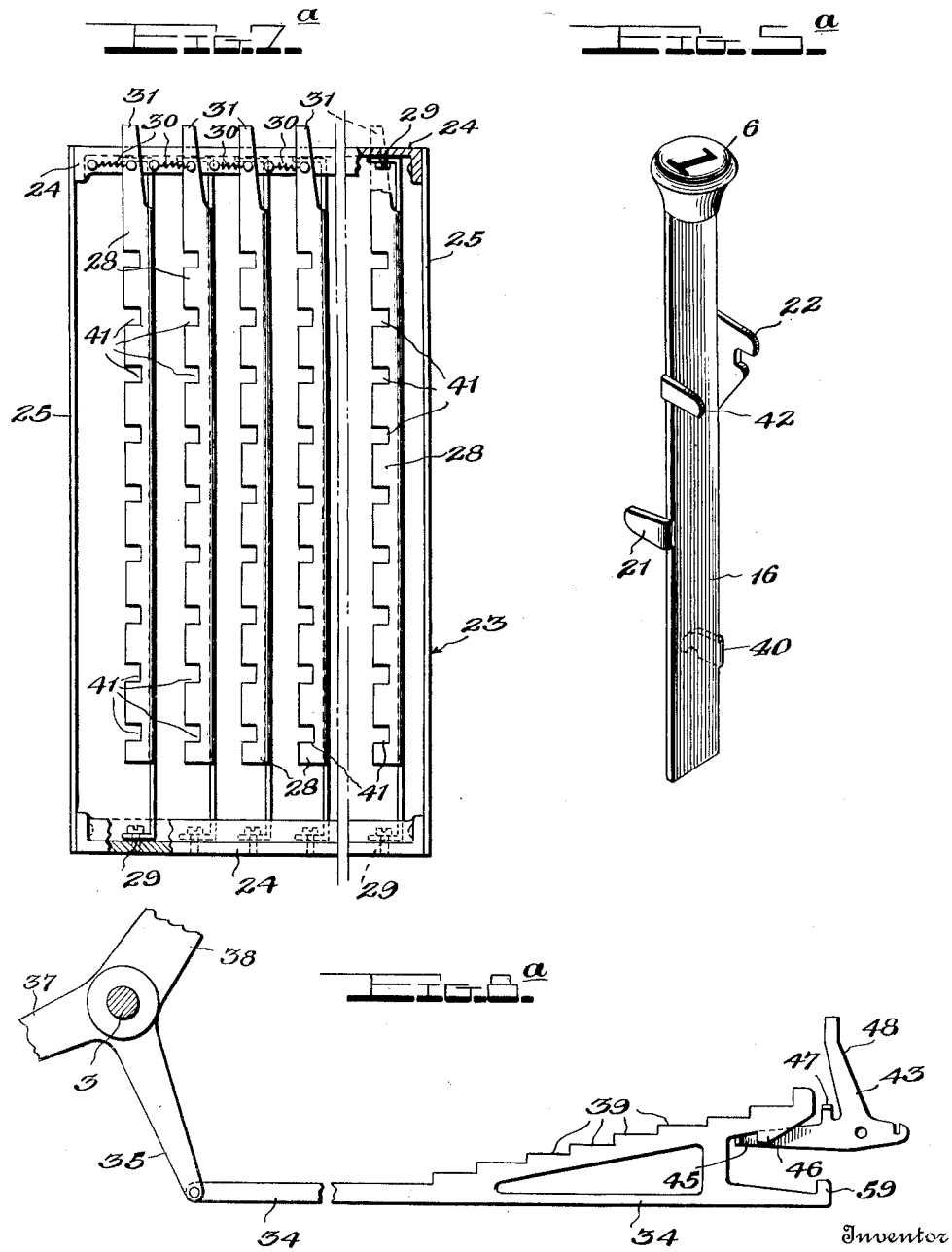

J. E. W. GREVE.
CALCULATING MACHINE.
APPLICATION FILED DEC. 12, 1916.
1,247,954.
Patented Nov. 27, 1917.
18 SHEETS—SHEET 8.
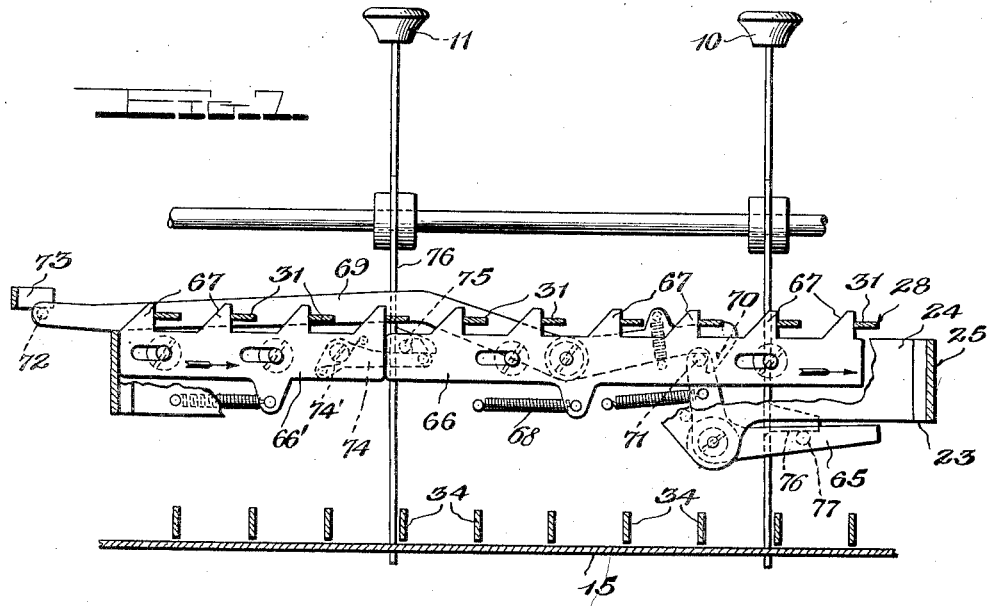
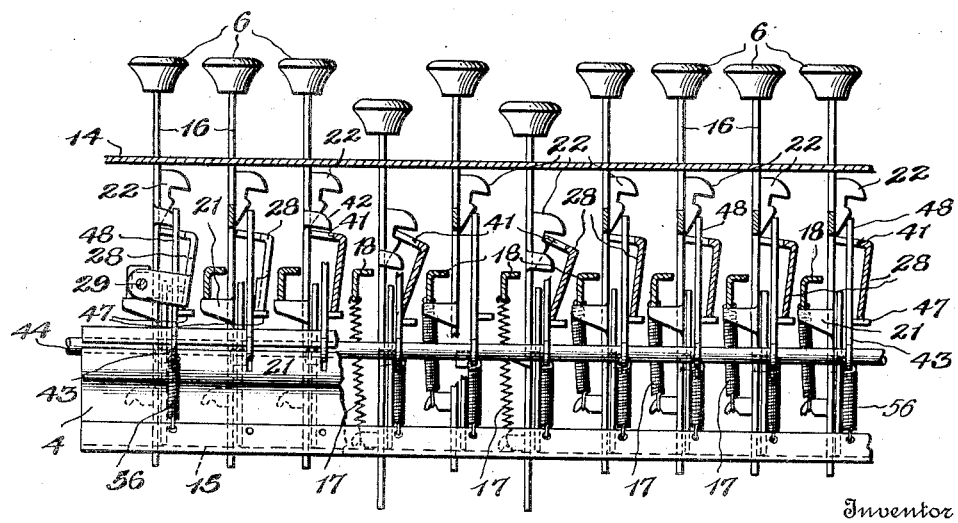
Witness
Chas. L. Grieshauer
Inventor
John E. W. Greve,
By
Emil Nauwelycke
Attorney

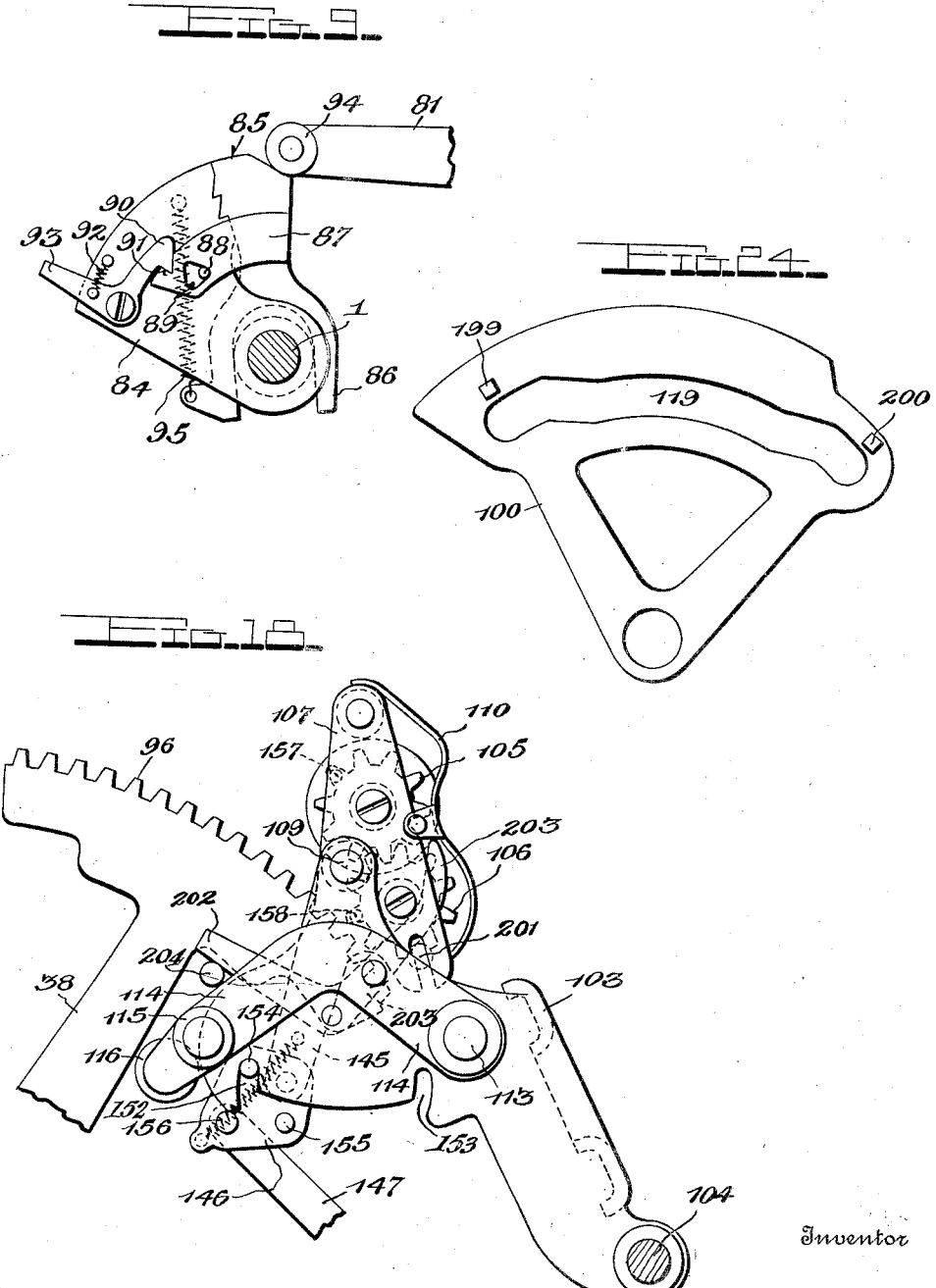

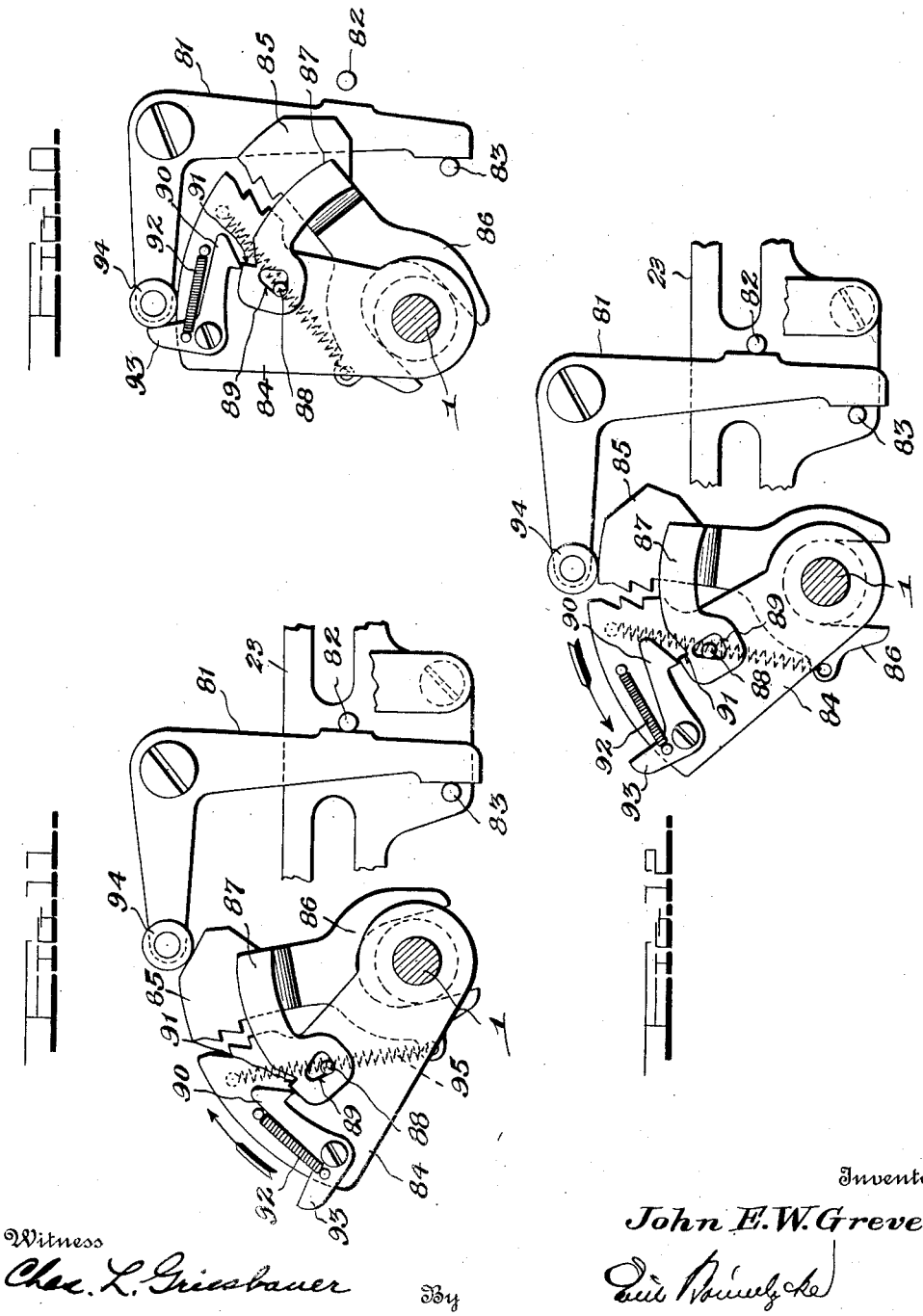

J. E. W. GREVE.
CALCULATING MACHINE.
APPLICATION FILED DEC. 12, 1916.
1,247,954.
Patented Nov. 27, 1917.
18 SHEETS—SHEET 11.
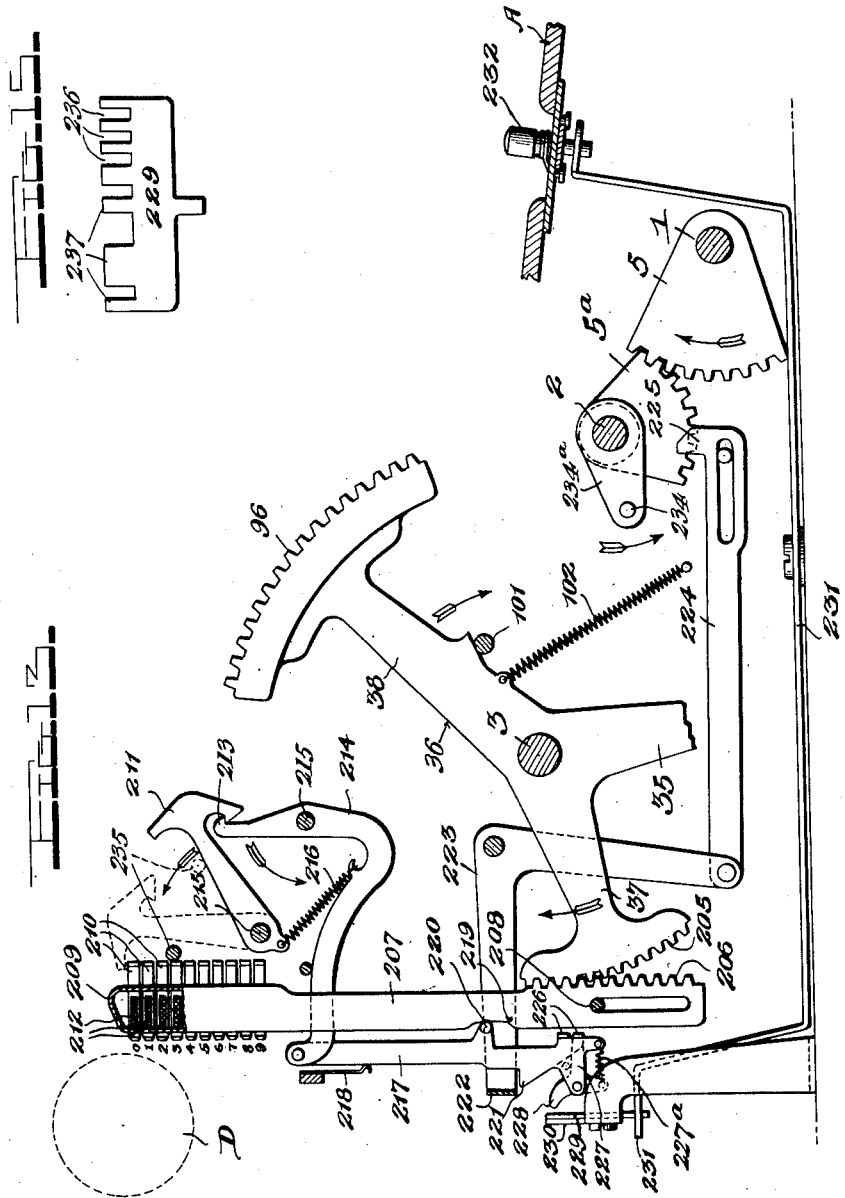
Inventor
John E. W. Greve,
Witness

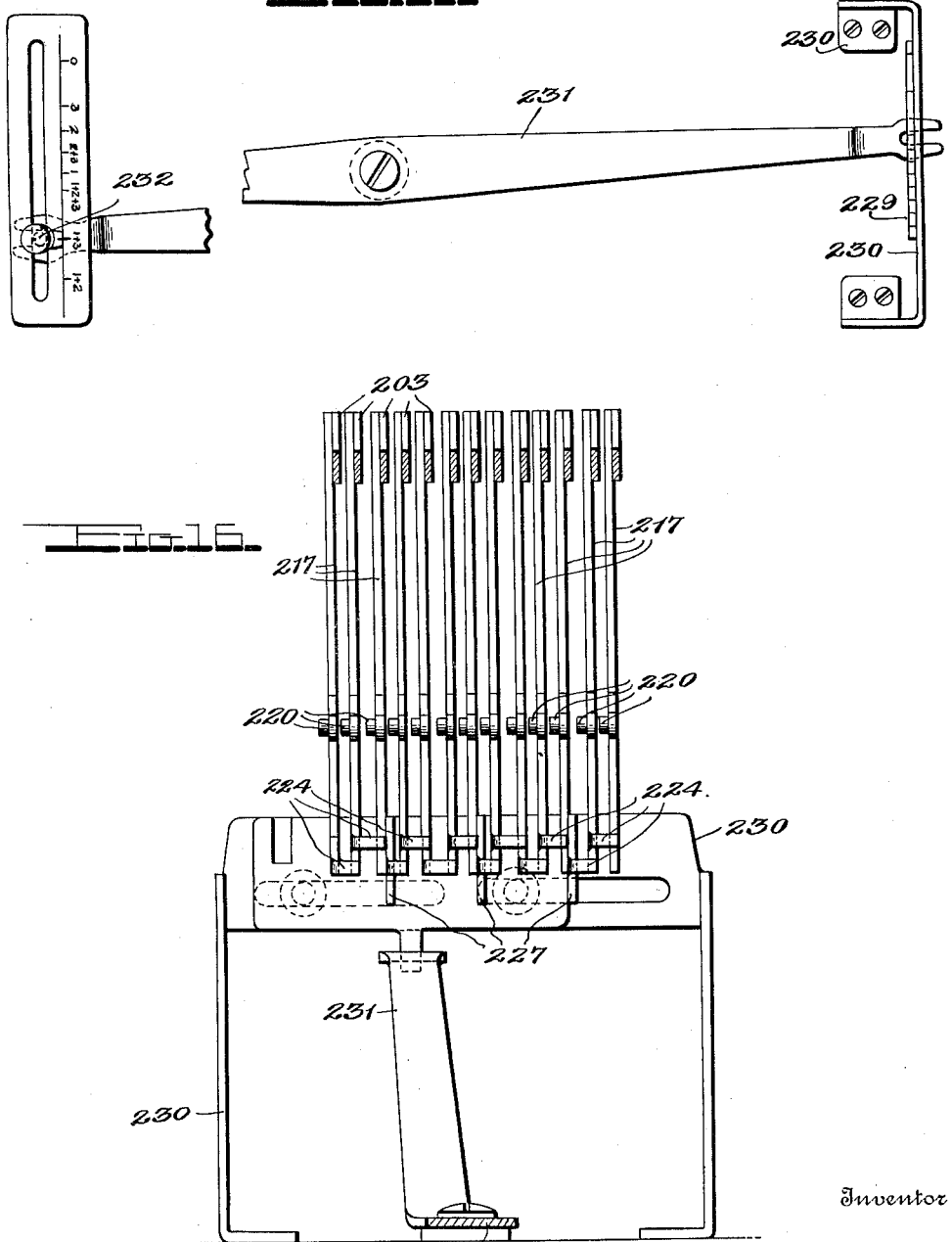

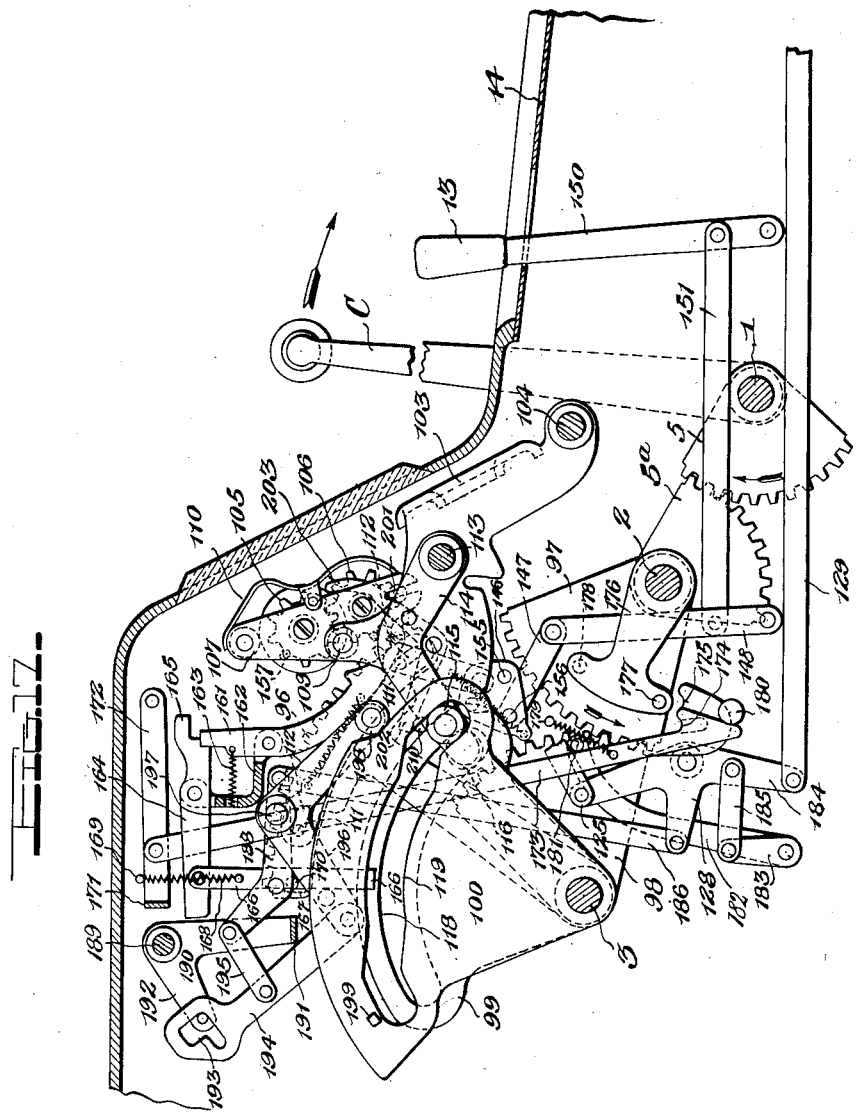

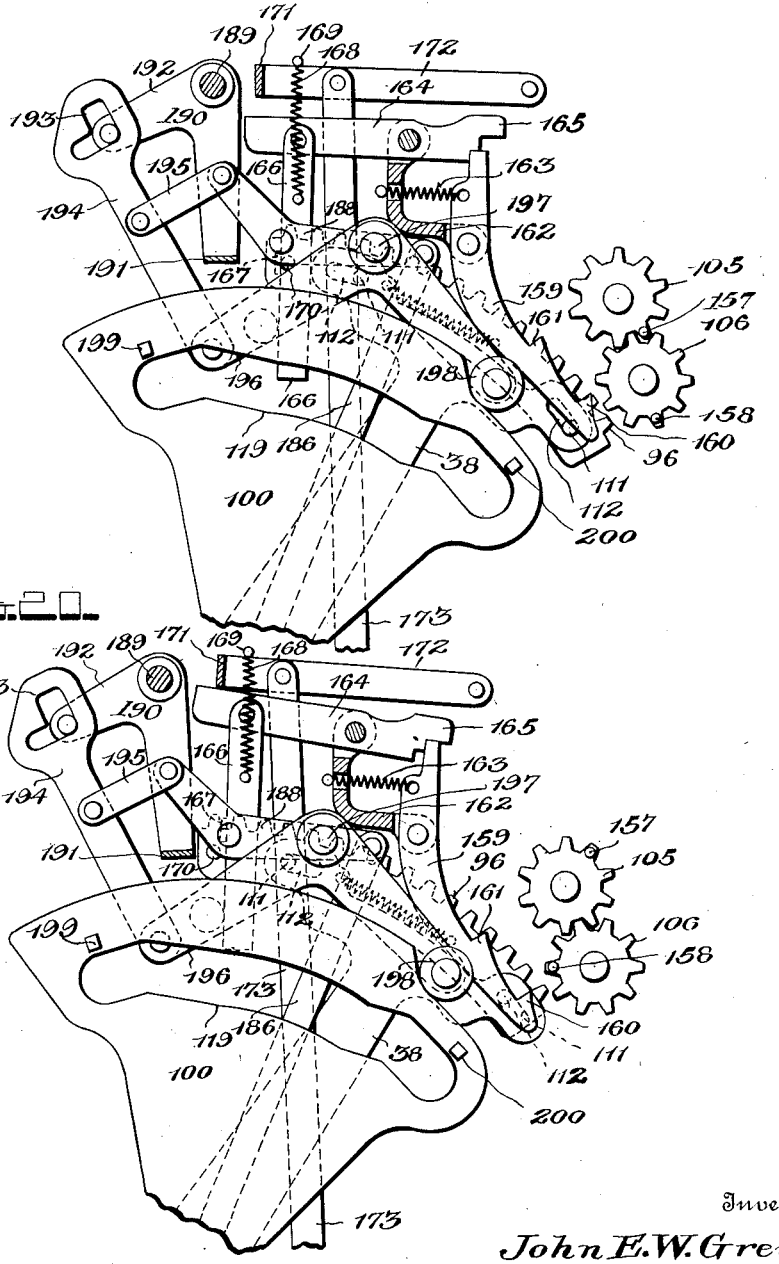

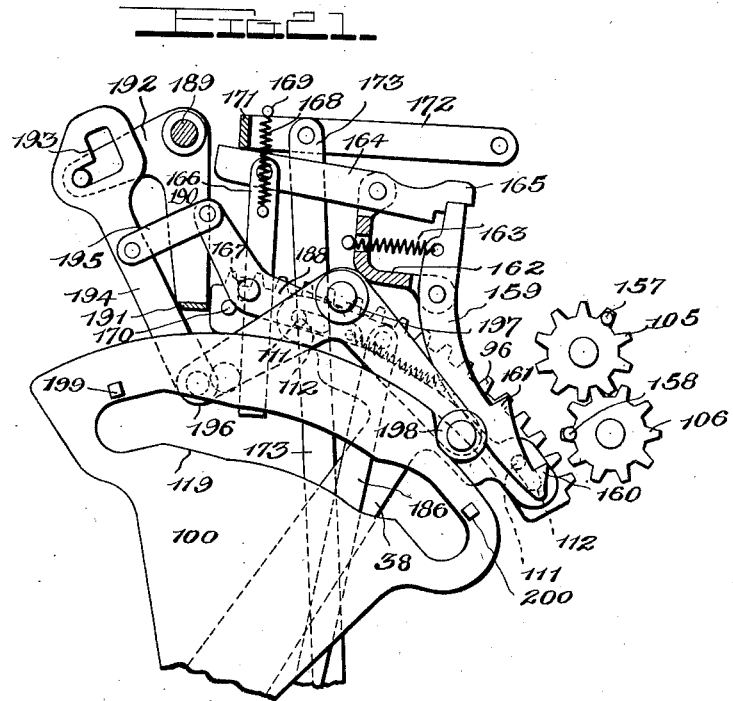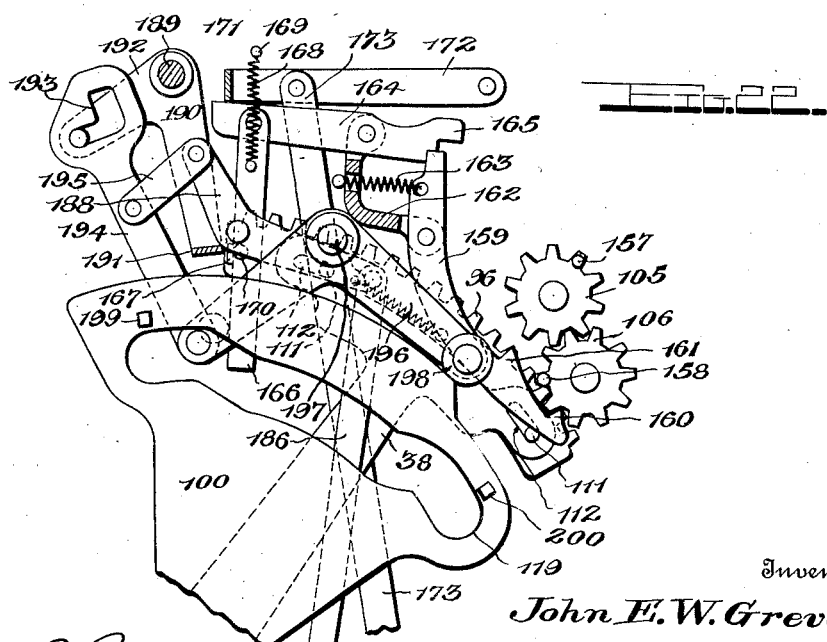

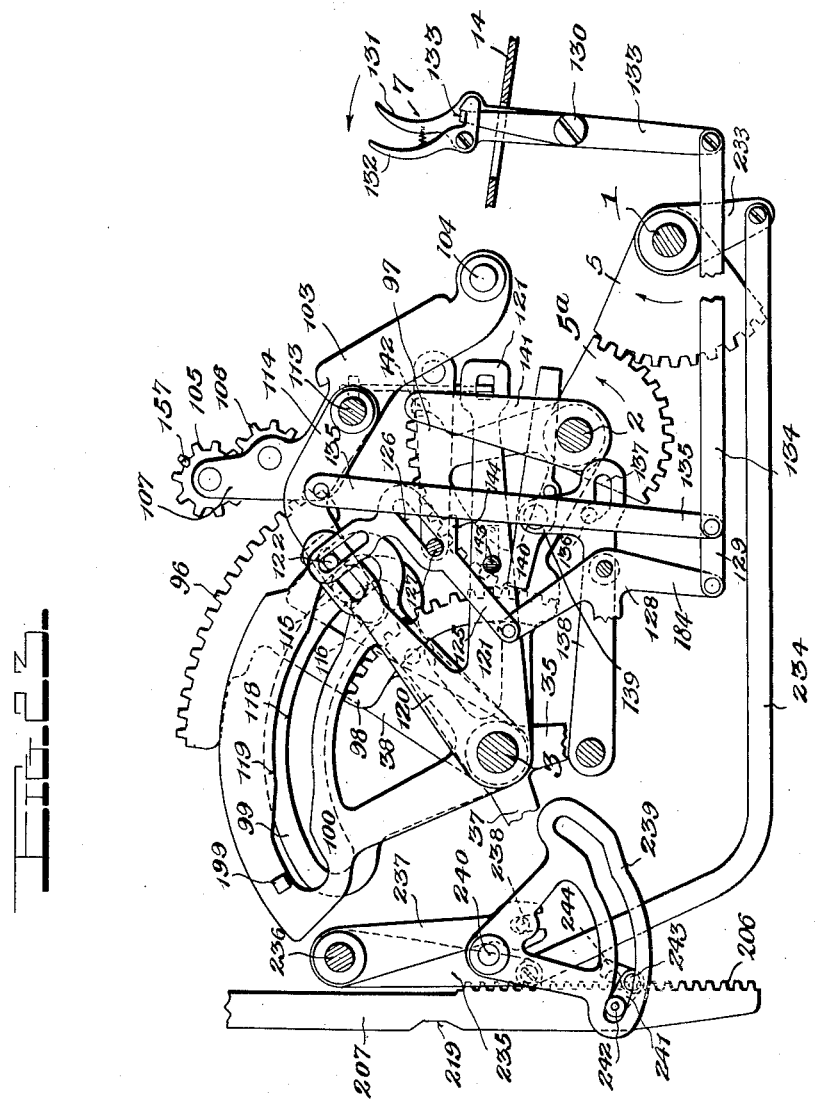

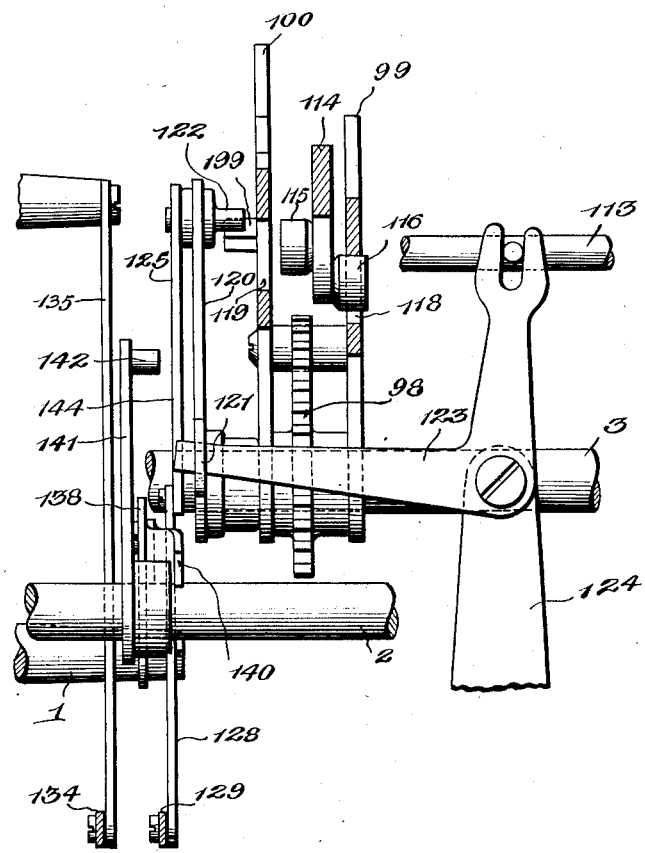

J. E. W. GREVE.
CALCULATING MACHINE.
APPLICATION FILED DEC. 12, 1916.

1,247,954.

Patented Nov. 27, 1917.
18 SHEETS—SHEET 18.

Witness
Chas. L. Griesbauer

Inventor
John E. W. Greve,
By
Attorney

UNITED STATES PATENT OFFICE.

JOHN EMIL WILLIAM GREVE, OF CHEMNITZ, GERMANY, ASSIGNOR TO WANDERER-WERKE, VORMALS WINKLHOFER & JAENICKE, A. G., OF SCHONAU, BEI CHEMNITZ, GERMANY.

CALCULATING-MACHINE.

1,247,954.  Specification of Letters Patent.  Patented Nov. 27, 1917.

Continuation and consolidation of applications Serial Nos. 716,478, 716,479, and 716,480, filed August 22, 1912. This application filed December 12, 1916. Serial No. 136,442.

*To all whom it may concern:*

Be it known that I, JOHN EMIL WILLIAM GREVE, subject of the Emperor of Germany, residing at Chemnitz, Saxony, Germany, have invented certain new and useful Improvements in Calculating-Machines, of which the following is a specification.

This invention relates to calculating machines, and particularly to the class of key-set machines, as set forth in my co-pending applications, Serial Numbers 716,478, 716,479, and 716,480, which were filed August 22, 1912, and of which this application is a continuation.

The primary object of the invention is to construct a key-set machine comprising a series of mechanisms which combine to produce the complete machine.

In addition to the construction of a generally simplified machine, as above defined, the invention has for its object to provide an improved arrangement comprising a single mechanism which can be set for addition and subtraction in very simple manner, and requiring a single means only for the processes of both addition and subtraction. To this end, the computing mechanism consists in two sets or rows of counting wheels or disks, each of which rows is arranged on a common shaft or axis, and said axes are located in such adjacent parallel relation that peripherally contiguous wheels are in constant operative engagement with each other, said counting wheels and axes being mounted in a movable housing and one of said rows of wheels being provided with numeral disks for displaying the total then being carried by the machine.

By this mechanism it is possible either to put one row or the other into operative engagement with the setting mechanism for the purpose of carrying out one or the other process.

A further object of the invention consists in constructing a controlling means for the computing mechanism which is so arranged that the computing mechanism can always be brought into operative position by the same controlling mechanism for all computing steps, that is, for adding, subtracting, and for making totals and subtotals, and can then be returned to normal position after such computations are made.

Likewise, the invention consists in providing a printing mechanism in which the printing means is so arranged that the zeros are automatically provided for, either to print them in single column work or to insure their proper omission in multiple column work; thus, the invention includes a mechanism for dividing the machine at will, within certain limits, into a plurality of columns.

My invention furthermore contemplates, the provision, in combination with improved computing and printing mechanisms of a key-board mechanism. More particularly in this connection, the invention is designed to provide for the suitable locking and subsequent release of depressed keys by the locking mechanism, the mechanism acting both to lock the already depressed keys transversely of their longitudinal alinement and also to lock the remaining or elevated keys longitudinally during the operation of the crank handle.

For this purpose the locking mechanism is mounted to oscillate in a specially constructed frame adapted to carry only the locking mechanism, this frame being unitarily movable longitudinally of the machine. By this motion or movement of the frame other keys and levers of the keyboard, such, for example, as the error-key, the repeat-key, the total key, and other special keys can be collectively locked by the forward throw of the hand crank, in order to prevent a false depression of the keys or operation of levers after the beginning of the forward movement of the crank.

With the above and other objects in view, as will hereinafter appear, my invention will now be fully set forth and described, reference being had to the accompanying drawing.

In said drawings:—

Figure 1 is a side elevation of the machine,

Fig. 2 is a plan view,

Figure 26:
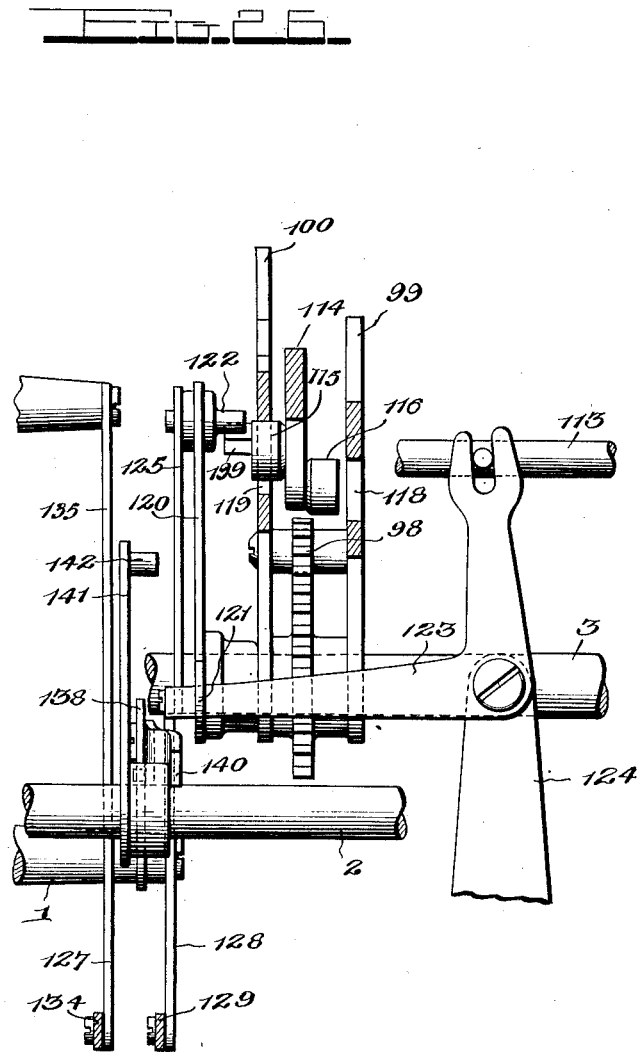

Fig. 3 is a side elevation of the various mechanisms, parts being sectioned, and parts being broken away for the sake of clearness, Fig. 4 is a part plan and part sectional view of the key-board mechanism, the cover plate having been removed, Fig. 5 is a section on line 5—5 of Fig. 4, Fig. 5ª is a detail of one of the keys, Fig. 6 is a longitudinal sectional detail of a portion of the key-board mechanism, Fig. 7 is a section on line 7—7 of Fig. 6 looking in the direction of the arrow, Fig. 7ª is a plan view of the key-board locking mechanism, Fig. 8 is a sectional view of the key and locking bar arrangement as seen from the front of the machine.

Fig. 8ª is a side elevation of one of the locking-bars and its connection to the number and type setting mechanism.

Fig. 9 is a detail view of a key-lock releasing device,

Figs. 10, 11 and 12 are views similar to Fig. 9, showing the parts in different operative positions, Fig. 13 is a detail sectional view taken longitudinally through the machine and showing only the printing mechanism, Fig. 14 is a detail showing, in plan, of the printing mechanism setting device, Fig. 15 is a detail of the setting device, Fig. 16 is a front elevation, partly in section, of a splitting mechanism used in connection with the printing mechanism, Fig. 17 is a longitudinal section through the machine and showing particularly the computing mechanism, Fig. 18 is an enlarged detail view of the computing mechanism, Figs. 19, 20, 21 and 22 are further detail views of the same mechanism showing the elements in various operative positions, Fig. 23 is a side elevation of the controlling mechanism for the computing devices, the view being a longitudinal detail section through the machine, Fig. 24 is a detail view of one of the parts, Fig. 25 is a front view, partly in section, of the controlling mechanism, and Fig. 26 is a similar view of the same parts, in different operative positions.

Referring more particularly to the drawings in Figs. 3, 5 and 6, 1 represents a main shaft, 2 a counter shaft and 3 a rigid carrier or supporting shaft, which are mounted transversely across a frame work 4, which in turn is inclosed within a casing A and secured in a base B. The shaft 1 is controlled by the crank lever or hand crank C located outside of the casing A, and actuates the shaft 2 through the medium of the gear segments 5 and 5ª, and motion of shaft 2 is communicated to the several mechanisms on shaft 3 and other organisms by the instrumentalities which are hereinafter described.

Keyboard mechanism.

The setting and controlling elements are located in a forward compartment of the casing A, and comprise generally speaking the number keys 6, a total key 7, a repeat key 8, locking keys 9 and 9ª, error key 10, a split key 11, a column key 232 and the adding and subtracting lever 13, together with the means for locking and releasing all of the keys. The numerals in each longitudinal row of keys run from 1 to 9, and mechanism is provided in the machine for setting zeros automatically, so that no particular setting of these is required.

A top plate 14, and lower plate 15 are carried by the casing A and base B, respectively, and form guiding supports for the number keys 6, the flattened spindles 16 of the latter riding vertically in registering slots in the plates. Springs 17 stretched between hooks formed in the lower ends of spindles or shanks 16 and longitudinal bars 18 mounted in rigid parallel relation on the frame 4 normally hold the keys 6 in upraised or depressible position. It will be noted that the bars 18 are supported on studs 19 at the front of the frame 4 and are suspended from flanges 20 at the rear of the frame, and that one of the bars extends between each of the rows of keys 6. Below the rigid bars 18 the spindles 16 are also provided with the ears 21 which bear below the respective bars 18, when the keys are upraised, thereby acting as stops to their upward movement.

As shown in Fig. 5ª, the spindles 16 are furthermore furnished with oppositely turned ears 22 which extend some distance vertically of the spindles and have their upper ends formed into rounded locking heads and their lower portions cut into wedge-shape, to coöperate with a locking mechanism. Overlying the rigid framework 4, but being held between the longitudinal members thereof, is a rectangular frame 23, which surrounds the whole bank of number keys and certain of the special keys. The frame 23 comprises the transverse end bars 24 having inwardly directed flanges, and the longitudinal side-plates 25, (see Fig. 7ª). The frame 23 is suspended between the side members of the rigid frame work 4 by means of links 26 (Fig. 5) pivoted at their upper ends upon the inner faces of the rigid frame and at their lower ends upon the outer faces of the longitudinal projections 27 on the side members 25. Extending longitudinally of the frame 23 is a set of parallel transversely swinging bars 28, which correspond in number to the number of the key rows, and consist of angle-bars having the overturned bearings 29 formed on the vertical elements of their sides, so that the horizontal element may be turned into and out of engagement with the notches in the ears 22. Each of the bars 28 is normally turned into contact with the spindles 16 by means of springs 30 (Fig. 7ª) connecting the overhanging tongues 31 of the bars and the top face of the rear frame side. The frame 23 is also kept in normal position against a forward transverse stop bar 32 (Fig. 6) by means of a spring 33 interposed between the frame 23 and framework 4, as shown in Fig. 3. Thus the frame 23 movably supports the bars 28 as a collective unit and each of the bars 28 has a swinging movement on an independent longitudinal axis in the frame. When any one of the keys 6 is depressed the lateral flange of the corresponding bar 28 is drawn into the notch in the ear 22 of the depressed key, so as to lock the key in depressed position, the wedge-shaped lower portion of the ear 22 causing the bar to swing outwardly over the ear until the notch is reached. It is readily evident that the depression of a second key will throw the bar 28 outwardly to release the first key depressed, so that only the last depressed key will be locked in set position.

In addition to locking individual keys 6 in depressed positions, the bars 28 also have the function of locking the keys, both depressed and idle, in position during an operative cycle, through the longitudinal movement of the frame 23. Thus each bar 28 has a plurality of transverse notches 41 (Fig. 7ª) which register with lateral lugs 42 projecting from the spindles 16 opposite the ears 22, and when the frame 23 is moved longitudinally, the notches 41 move out of this state of registration, so that those keys which are idle, have their lugs disposed above the bars 28 and are thus locked in raised position, while those keys which are depressed have their lugs disposed below the bars, and are similarly locked against raising until the frame 23 is returned to normal position.

Extending below the key locking mechanism and longitudinally between the rows thereof, are the slide-bars 34 which associate the keys with the various mechanisms for printing, counting and computing. Said slide-bars are connected at their rear ends to the downwardly projecting arms 35 of rotary setting devices 36 which are carried on the shaft 3 (Figs. 8ª and 13) being equal in number to the rows of keys and having type-setting arms 37 and counting mechanism setting arms 38 as will hereinafter appear. The forward ends of the slide-bars 34 are raised in regular steps 39 which form stops to be engaged by lugs 40 (Fig. 5) overturned from the edges of the keys 6 and projecting into the paths of movement of the bars 34, the lugs of each succeeding transverse row toward the rear of the keyboard being located at a slightly lower level to correspond to the proper step 39 on the slide-bar. The arrangement of the machine is such that the zeros are automatically set, that is, without the depression of a key therefor, and it is necessary therefore that the bars 34 be automatically stopped to set a zero or else released to be governed by the key 6 which has already been set. For this purpose a series of latches 43 is mounted loosely on a transverse rod 44 (Fig. 5) which has a rotary motion for another purpose which will appear later. Each latch 43 (Fig. 8ª) consists of an irregular plate having a rearward projection 45 which is overturned into the path of a toe 46 of its corresponding slide-bar 34, a release lug 47 which is depressed by the corresponding lock-bar 28 to throw the projection 45 out of the path of the toe 46, and a release arm 48 which is extended into the path of an automatic release bar 49 (Fig. 4) carried by the frame 23 for the purpose of releasing all of the latches 43 from influence over the slide bars when totals are being taken. Thus the release bar 49 is an elongated plate which slides transversely upon the flanged portion of the front bar 24 of the frame 23, and in suitable slots in the side members, and has a series of notches 50 which normally receive the upper ends of the release arms 48 when the usual additions or subtractions are being made. The bar 49 has an extension 51 beyond the frame 23 upon which a pin 52 is mounted, the latter acting as a bearing for the forward end of a bar 53 whose opposite end is horizontally pivoted on a pin 54 supported from the side of the frame work 4. In Figs. 3 and 4, the total key 7 is pivoted on a laterally projected stud on the slide-frame for longitudinal oscillation, and in this movement acts against a cam surface 54' on the inner edge of the bar or lever 53 so that when the latter swings outwardly, its end will throw the pin 52 and consequently the bar 49 laterally against the action of a spring 55, so that the notches 50 are removed from registration with the release arms 48, and when the frame 23 moves rearwardly the body of the bar 49 will strike the arms 48 collectively and throw them all to the rear, thereby moving the projections 45 out of the paths of all the toes 46 against the action of the springs 56 (Fig. 5).

In order to lock groups of the slide-bars 34 against any setting action, as when column totals are being taken, the locks 57 are provided. These locks 57 are fixed on the rotary shaft 44, and have fingers 58 (Fig. 5) which may be carried into the paths of the lugs 59 which extend upwardly from the lower front ends of the bars 34. The two keys 9, pivotally connected to the various groups of locks, provide means for depressing the latter into locking connection with the slide-bars 34. Thus if the machine is divided for the computation of gas bills, and the first six columns on the right in Fig. 4 are for cubic meters of gas for cooking and the remainder are used for the computation of lighting gas, which may be totaled later, then the actuation of the right hand key 9 will prevent the taking of a total on the lighting gas columns, but will permit a taking of the total on the cooking gas side, when the actuation of the crank handle C releases the slide-bars 34.

By a backward throw of the crank handle C an arm 61 (Fig. 6) fastened upon the intermediate shaft 2 is swung downwardly through the gears 5 and 5ª at the time that the frame is swung. This arm 61 carries an oscillatory bell crank lever 62 on which is a stop pin 63 which is normally held in engagement with the upper edge of the said arm. When the arm 61 is swung downwardly the bell crank lever 62 is carried therewith in rigid connection, by reason of the stop pin 63, and the movement of the arm 61 is imparted to a second bell crank lever 65 (Fig. 7) mounted on the rear bar or side of the frame 23 to extend transversely of the machine, thus giving the latter a downward swinging motion.

The bell crank lever 65 has one arm releasably connected with a transversely slidable plate 66 (Fig. 7) which is mounted upon pins projected from the rear face of the rear bar of the frame 23, so that when lever 65 is rocked it will carry plate 66 with it to the right. Said plate 66 has a plurality of lugs 67 which extend into position beside the rear ends 31 of the locking bars 28 so as to throw them out of spindle locking position at the proper interval, the retraction of the plate being against the action of a spring 68 interposed between the frame 23 and the plate. Mounted on the plate 66 is an elongated rock arm 69 which has, on one end, a hooked head 70 which engages behind a pin 71 projecting from the side of the upper arm of the bell crank lever 65 so as to normally lock the latter to the plate, thereby effecting the desired connection between said parts. The opposite end of the rock arm extends beyond the limits of the frame 23 and has a pin 72 which stands in operative engagement with a lever 73 pivoted upon the side of the frame work 4. The repeat key 8 is mounted on this lever 73, so that upon depression of the latter, the engagement between the crank 65 and the plate 66 through the rock-lever 69 is broken. Since the plate is not actuated to throw the lock-bars 28 out of engagement with the key-spindles, then the previously set number can be repeated until the key 8 is released. In order to permit the repetition of the first digits of regularly progressing numbers, as the numbers of workmen in column work, the plate 66 is divided to have a section 66', which is normally coupled to the main section to move therewith through a lock pawl 74 which is pivoted to said section 66' and is pressed into engagement with pin 75 on the main section by means of a spring 74'. The split key 11 carries a pin which overlies the pawl 74, so that upon depression of the key, the plates 66 and 66' will be disconnected.

Thus, when running accounts are to be printed, it will be understood that for each new number the repeated numerals must be touched again, as occurs, for example, in the computation of wages. In this case the left side of the machine is used for the reception of the workmen's numbers and the right side of the machines for the salary amounts. The workmen's numbers run in numerical order, for example, 1321, 1322, 1323, etc., while at the right of these numbers the proper wage amount appears. In order to retain the repeated keys or first digits of the same numbers in depressed position, the section 66' of the release plate is uncoupled by depression of the split key 11 thereby releasing only the wage column and the last point or numeral of the running numbers, so that in the above example the numerals 1—2—3 remain fixed and only a numeral 4 need be brought into use, in order to form the next workman's number.

If it becomes necessary to release all or several of the keys before the regular automatic release through the bell-crank 65, the error-key 10 is depressed. This key 10 (Figs. 5 and 7) is mounted adjacent the main section 66 and has a lug 76 which lies above the pin 77 on the bell-crank 65, so that when the key is depressed, the bell-crank 65 is actuated to release all of the keys, as hereinbefore described.

The frame 23 is swung longitudinally to effect those of the foregoing operations that pertain to it in the following manner.

Each key spindle 16 possesses a transversely bent ear 42 (Fig. 5ª) which can operate through a slot 41 (Fig. 7ª) in its lock bar 28 at each depression of the key as previously stated. Upon the shaft 1 at one side of the frame is provided an actuating device which imparts a reciprocating motion to a bell crank lever 81. The latter is pivoted on a stud projecting from the side frame of the machine, and has its downwardly projecting arm loosely engaged between a pair of spaced pins 82 and 83 located on the side of the frame 23, so that as the bell crank 81 is oscillated, the frame 23 is reciprocated. In the form shown in Fig. 6, however, the depending arm of the bell crank is bifurcated to fit over a pin projecting from a fixed ear or lug formed on the frame 23.

The actuating device consists of a segment 84 fixed on the shaft 1 (Figs. 9, 10, 11 and 12) and a segment 85 having a bifurcated bearing 86 which loosely straddles the hub of segment 84, the bearing 86 in normal position not resting fully on the hub but being slightly upraised. The segments 84 and 85 are toothed along opposing edges to interlock into a continuous plate, and are further yoked together by means of a plate 87, carried by the segment 85 and overlying the side of the segment 84; a pin 88 on the latter extending into a triangular opening 89 in the end of the plate 87. A locking pawl 90 is mounted on the same side of the segment 84 and engages normally a notch 91 in the plate 87, a spring 92 tending to push the pawl into engagement. An arm 93 on the pawl 90 extends above the upper edge of the segment 84 and stands in the path of a roller 94 on the end of the horizontal arm of the bell crank lever 81. When the actuating device is operated by the crank handle C, it moves in a clockwise direction, with the result that it raises the roller 94 carried by the bell crank lever 81 and rocks the latter, so as to impart to the frame 23 carrying the lock bars 28 a slight rearward movement. In consequence the free movement of the projections or ears 42 of the key spindles is obstructed and said ears or projections abut against the lock bars 28. In this manner any false or accidental depression of the keys will be prevented after the beginning of the crank movement.

In a similar manner the forward movement of the frame 23 can be employed to lock all keys and levers of the key board, as for instance, the error key, the total key, the repeat key, etc. The sectioned portions of Fig. 4 show the different parts of the key board in their relation to the lock arms 28. In the first row after the four numeral rows on the left the lock bar is illustrated in normal position, in the second row the lock bar is shown in position occupied in connection with depressed keys and in the third row it is shown in locked position.

The aforementioned actuating device is constructed of the two parts 84 and 85 in order to obtain a premature release of the key-locking mechanism during the return stroke of the crank, and before the end of the crank movement.

When the parts of the actuating device stand in normal position they are locked together by the pawl 90 in the position of Fig. 9. As the crank C is actuated in the forward direction the device is rocked and in turn actuates the bell crank lever 81 by means of its roller 94.

Toward the end of the forward movement of the crank the friction roller 94 strikes against the arm 93 and releases pawl 90 from the notch 91 in the member 87 so that the segments 84 and 85 are uncoupled through the action of the spring 95 which extends between the parts to draw segment 85 off the hub of segment 84. Before the end of the return stroke of the crank C the roller 94 reaches the now yielding part 85 so that the bell crank lever 81 pushes segment 85 down on the hub of segment 84 and not meeting any resistance on the roller 94 swings to its normal position before the end of the stroke and returns the frame 23 to leave the key board in position for setting up a new number, the spring 33 being of sufficient strength to return the frame.

Adding mechanism.

The adding and subtracting mechanism is controlled by arcuate gear racks 96 which are mounted on the ends of the arms 38 of the setting devices 36 (Fig. 13) carried by the shaft 3, as hereinbefore described, the setting devices being connected to the slide bars 34, which are set by the keys 6. Upon forward movement of the crank C, through the gears 5 and 5ª upon the shafts 1 and 2, the intermeshing gears or segments 97 and 98 (Fig. 23) are actuated, the gear 97 being fixed to shaft 2. The gear 98 is a unitary structure with a pair of reversing disks 99 and 100 (Fig. 25) which are loosely mounted on the shaft 3, the gear 98 standing between the disks, and drawing them forward with the movement of the hand crank C. The disks 99 and 100 are the controlling devices by means of which the adding and subtracting operations are effected by a single counting mechanism. The setting devices 36 are normally upheld by a transverse stop rod 101 (Fig. 13), against the action of the springs 102, which are stretched between the arms 38 and suitable fixed points on the machine frame. The stop rod 101 is lowered by the action of the crank handle, during its forward stroke, thus releasing the setting devices 36 to the action of the springs 102, which draw them forward as long as the slide rods 34 are free to move therewith, and when the setting devices are stopped by the rods 34, various printing and computing operations have occurred or are set to occur, as will hereinafter appear, and in the meantime, the control devices 99 and 100 are positioned by the action of the gears 97 and 98 to govern the character of the computation which is to be made in a set of counting wheels.

The counting or computing mechanism is housed in a swinging frame 103 which is journaled upon a transverse shaft 104 to oscillate toward and from the set of gear racks 96, and it comprises the rows of computing or counting wheels 105 and 106 which are mounted upon parallel shafts journaled in side plates 107 (Figs. 18 and 23) of a housing which oscillates about the sockets or bearings 109 in the sides of the frame 103, so that the computing wheels have two movements, one relatively to the frame 103 and one with the latter. The side-plates 107 are joined by a transverse rod, so that the housing is securely formed to oscillate on the frame 103, and a cover plate 110 (Fig. 18) having an aperture therein permits the reading of the computations on the counting wheels 105, number disks carried by the latter being visible through said aperture and a glass-covered window formed in the machine casing, above the key-board. The counting wheels 105 and 106 are geared pinions and stand in constant mesh with one another, and, according to whether the computing operation is additive or subtractive, either the row 106 or the row 105 is brought into direct mesh with the gear racks 96 to be eventually rotated thereby. The gear racks 96 are slidably mounted on the arms 38, as by the pins 111 operating in slots 112 formed in the sides of the racks, and are normally held in a position at the left in Figs. 19–22, but are thrown to the right to give an additional impulse to the counting wheels on occasion, as will later appear.

The counting wheels are brought into engagement with the racks 96 in the following manner. The frame 103 carries a shaft 113, which is longitudinally movable with relation to the frame 103. Upon the end of the shaft 113 is secured an arm 114, on whose free end are journaled the rollers 115 and 116, (Figs. 25 and 26) the rollers lying on opposite sides of the arm 114. The rollers 115 and 116 operate in slots 119 and 118 in the segments 100 and 99 respectively, (Figs. 23–26), the slot 118 being a regular arc concentric to the axis of the segment 99, while the slot 119 in the segment 100 is irregularly curved and has only its central part lying in concentric relation to the axis thereof. Upon the shaft 3 is a rotatable bell crank lever whose arms 120 and 121 lie closely together, the arm 120 having its end slotted to receive a slidable pin 122 (Figs. 25 and 26) for coöperation with a pair of lugs 199 and 200 formed upon opposite ends of the segment 100, (Fig. 24) while the other arm 121 has its end apertured to receive the end of one arm of a bell crank lever 123, (Figs. 25 and 26). The bell crank lever 123 is mounted to oscillate upon a standard 124 secured to the base of the machine, and has its opposite arm extended upwardly and bifurcated to straddle a pin projected from the shaft 113. Thus operation of the bell crank lever 120, 121 tends to shift the shaft 113.

The pin 122 is also entered in a slot in one arm of an angular regulating plate 125, (Fig. 23) which has a second slot 126 in its other arm to receive a fixed pin 127, the free end of the latter arm being pivotally connected to the upper arm of a three armed lever 128. The lower arm 184 of the lever 128 is operatively connected by means of a draw bar 129 to the total key 7, which is rotatable forwardly and rearwardly around a transverse stub-shaft 130 and is provided with a hand grip 131. Adjacent the hand grip 131 is pivoted a latch 132, which, under the action of a spring is normally held in engagement with the bent end of a lever 133 rotatably mounted upon the same stub shaft which carries the key 7, and lies against the latter throughout its length.

The lever 133 has its free end pivotally connected to a rod 134, (Fig. 23) whose opposite end is connected to an oscillating lever 135. Said oscillating lever 135 is suspended from a fixed point on the machine housing and carries a pin 136 (Fig. 22), which engages in a slot 137 formed in a rotatably mounted lever 138. The lever 138 carries an upward projection 139, which supports a rock lever 140. Upon the intermediate shaft 2 is secured an arm 141, which is provided on its free end with a lug or pin 142, which in certain positions strikes against the left end of the rock lever 140. The arm 121 of the bell crank lever 121, 122 carries an intermediate lug or pin 143 with which a projection 144 of the adjusting piece 125 is adapted to coöperate. The intermediate pin 143 of the arm 121 is spring-controlled, and is mounted for endwise movement so that the projection 144 can wipe by it upon upward movement of the lever arm 121, in the event that the adjusting plate 125 is still located in its lowermost position, the end of the pin 143 being shaped to permit this action.

As above stated, the arm 114 carries the rollers 115 and 116 which operate in the cam slots 119 and 118 of the segments 99 and 100, in alternate relation, in accordance with the position occupied by the longitudinally slidable shaft 113. By this means the frame 103 and with it the computing mechanism is moved toward and from the gear racks 96, so that the counting wheels 105 and 106 can be set to alternately enter into and out of engagement with the racks, and in order to enable the machine to carry out subtraction operations, the following mechanism is provided. Upon the end of the extension or projection 145 (Fig. 18) of one of the side plates 107 is pivotally secured an element 146 which serves as a latch or lock and has its opposite end pivotally secured to a link 147 by means of a lever 148 (Figs. 17 and 18). The lever 48 is connected with an operating lever 150 by means of a link 151 (Fig. 17). The lower side of the frame 103 is provided with a projection forming the notches 152 and 153 into which the pins or lugs 154 and 155 provided on the ends of the lock plate 146 are respectively adapted to engage. The engagement of the pins or lugs 154 and 155 in the notches is completed by the drawing action of a spring 156, which controls the latch plate after it has passed over the dead center. The locking of the pins 154 and 155 in either of the notches 152 or 153 determines the position of addition or subtraction.

For the control of the transfer operation the following mechanism is provided. The computing wheels 105 and 106, respectively, are provided with the transfer pins 157 and 158, (Figs. 19 and 20) which operate upon the lugs 160 and 161, upon the transfer levers 159. Said transfer levers 159 are mounted upon a bridge piece or comb 162 which extends transversely through the machine, and their upper ends are drawn toward said comb through the springs 163. The comb 162 serves also to carry a set of intermediately pivoted lock levers 164 each of which is provided with a nose or projection 165, on which is linked one end of a bar 166, which is provided with a transverse lug 167. Springs 168, which are supported by a spring bar 169 extend across fixed parts of the frame and have the effect of drawing the bars 166 and their lugs 167 upwardly. Said bars can be guided in their vertical movement in any suitable manner, for instance, by guide rods, slotted plates or in other ways. Against the projections or lugs 167 the pins 170 of the racks 96 operate to turn the wheels one step to make the carry-overs.

Above the lock lever 164 is suspended a bar 171 (Figs. 19 and 20) supported by means of oscillatingly mounted arms 172. Or, if desired the bar 171 and the arms 172 may constitute an integral member. The purpose of the bar 171 is to return the parts 159, 164 and 166 to their normal position. On one arm 172 is pivotally connected a draw bar 173, whose lower end is transversely forked and provided with the hooks 174 and 175 (Fig. 17). Upon the intermediate shaft 2 is mounted an anchor-shaped member 176 which carries two pins 177 and 178, of which the pin 178 is positioned upon the upper side of the arm 176 and the pin 178 upon the lower side thereof. Since the arm 176 swings between the hooks 174 and 175 of the draw bar 173, the pin 177 can rest or engage within the draw bar hook 174 while the pin 178, according to the position of the draw bar, either hangs idly or is engaged in the hook 175. A spring 179 holds the draw bar normally in raised position, while a lug or bar 180 acts in such a manner that upon the downward movement of the draw bars, the hooks 174 and 175 will be disengaged from the pins 177 and 178 of the arm 176 and the action of the spring 179 can follow.

Under the action of the spring 179 the draw bar 173 bears against the lug or pin 181 (Fig. 17) of an oscillatory lever 182. Upon the shaft of the lever 182 is mounted a second lever 183 which is connected to the lower arm 184 of the three-armed lever 128 by means of a link 185. The arm 184 of said three-armed lever 128 is connected to the total key 7 by means of the link 129, as hereinbefore described. A rod 186 is linked on the central or horizontal arm of said lever 128, said rod having a pivotal connection at its free end with a bell crank lever 188 (Figs. 19 and 20). Furthermore, upon a fixed transverse shaft 189 is mounted a swinging yoke or frame 190, which consists of a pair of bell cranks joined by a transverse member 191 extending across the width of the computing mechanism. The arm 192 of the bell crank 190 at one side carries a pin to engage in a right angled slot 193 in a link bar 194. Said link bar 194 is connected by means of a link 195 with the bell crank lever 188, and is also connected with one arm of a bell crank lever 196 which is pivoted on a stud 198. The opposite arm of the bell crank lever 196 carries a friction roller 197 which bears against the periphery of the control segment 100.

When a series of entries is to be added, the keys 6 are properly set, and the hand crank C is pulled forwardly thereby releasing the arms 38 of said devices by removing the lock bar 101 from in front of the latter. By this action all of the racks 96 carried by the carriers 38 are swung downwardly. After the racks 96 are thus set, the computing devices are swung into engagement with the racks. With the total key 7 occupying the position shown in Fig. 23, the friction roller 116 rests in its normal position in the arcuate slot 118 in the segment 99. When the crank C is drawn forwardly, then the elements 99 and 100 also swing forwardly until the lug 199 of the segment 100 strikes against the adjustable pin 122 of the bell crank lever 121. During this time, the roller 116 has progressed in the slot 118 until, by the abutment of the lug 199 against the pin 122, the bell crank lever is swung downwardly, whereby the bell crank lever 123 is carried therewith and the shaft 113 is carried toward the left in Fig. 25 so that the roller 116 is drawn out of the slot 118 and the roller 115 becomes engaged with the cam slot 119 in the segment 100, Fig. 26. When hand crank C is released and returns to its normal position the segments 99 and 100 are immediately returned to their starting position and the roller 115 must likewise move downwardly after the beginning of the backward stroke of the crank lever, following the course of the slot 119, so that, through the action of the arm 114, the carrier frame 103 with the counting wheels 105, 106 swings downwardly about its axis 104 and the wheels 106 are brought into engagement with the racks 96. While the cam roller runs throughout the course of the concentric part of the cam slot 119, the racks 96 set the counting wheels 106 which in turn set the wheels 105 during the continuation of the return movement to normal position. At this time the roller 115 driven by the curves of the cam slot 119, again rises and throws the counting wheels 106 out of engagement with the racks 96. Toward the end of the backward movement of the crank lever, the lug 200, (Fig. 24,) of the segment 100 strikes against the pin 122 and carries its bell crank backward, whereby the bell crank lever 123 will also swing backwardly, and the shaft 113 returned to the right, Fig. 25, the roller 115 will be carried out of engagement with the cam slot 119 and the roller 116 again carried into engagement with the arcuate cam slot 118 of the segment 99. In the process of subtracting numerals the actuation of the counting mechanism is the same as hereinbefore described, with the difference that the counting wheels 105 come into contact with the racks 96, due to the oscillation of the frame or housing wherein they are mounted, and are driven directly by said racks in the opposite direction from that in which they are rotated during the adding operation.

As the crank C is moved back to the rear and the positioned or setting sectors 36 with their racks 96 turn again to their normal positions, the racks turn the counting wheels 106 which are in engagement with the former as far as the set positions of the racks will permit. The counting wheels 106 act now as intermediate wheels and shift the counting wheels 105 which fully correspond with the former in the right degree, but in the opposite direction. The counting wheels 105 carry the numeral disks as before mentioned so that the total sum is continually visible through the inspection opening of the casing. Attention is here called to the fact that the counting mechanism is rigidly locked in its normal position by means of a lock pin 201 (Fig. 18) which normally engages the wheels 106. However, when the housing 103 is swung downwardly in order to bring the computing mechanism into working position, then the arm 202 of the bell crank lever 203 which is rotatably mounted upon the housing 103 bears against a lug 204 and turns said bell crank lever so that its other arm pushes the lock pin 201 out of the teeth of the wheel 106. Toward the end of the return movement of the hand crank C, the counting mechanism is again raised by the control devices, and the lock pin 201 is again brought into engagement with the wheels 106 by means of a spring (not shown). The second arm of the bell crank lever 203 is so formed at its end that it can operate in the same manner on the lock pin 201 if the counting mechanism is brought into subtracting position.

When it is desired to subtract, then the lever 150 is drawn forward by its key 13 (Fig. 17) and this motion through the medium of the draw bar 151 is communicated to the lever 148, which in turn, through the link 147 turns the lock or latch plate 146 around its pivot until the pin 154 is withdrawn from the left-hand notch 152 on the supporting frame 108. Then the extension 145 of the side plate 107 can follow the movement, until the pin 155 has snapped into engagement with the right-hand notch 153. The counting mechanism is now so turned upon the axis 109 that upon the downward movement of the housing 103 the wheels 105 come into direct engagement with the racks 96, while the wheels 106 run idly therewith, and obviously possess a direction of rotation which is opposite to that used in adding.

Each of the wheels 105 and 106 is provided in the usual manner with ten teeth, one of which teeth on each wheel is provided with the transfer pins 157 and 158 (Figs. 19 and 20), respectively. Said transfer pins operate against the projections or lugs 160 and 161 of the transfer lever 159 and turn the latter far enough toward the left, so that the lock lever 164 is free to be actuated by the spring 168 and the bars 166 and 167 can be drawn upwardly. If, in the adding process, a wheel 106 is turned for a space of ten, or more than ten teeth, then the transfer pin 158 will strike against the sloping portion of the lug 160, and swing the governing lever toward the left, which frees the lock lever 164 and permits the bar 166 to be raised, so that the pin 170 of the corresponding rack 96 is freed to release the rack 96 to move to the left by the action of a spring connected to the pin 111 through the length of the slot 112, which corresponds to the length of a tooth section, whereby the counting of next higher denomination is turned one step. Fig. 19 shows the counting mechanism in the usual position for adding, wherein the tooth carrying the governing pin 158 is so positioned that it will strike against the lug 160 upon a slight further rotation of the wheel. When, upon the beginning of the return movement of the crank C the counting mechanism is brought into engagement with the racks 96 by the medium of the controlling device, said racks having already been set to correspond to the depressed numbers, the governing pin begins to operate and the gear segment is moved toward the left to the next higher position, whereby it imparts an additional rotation to the corresponding counting wheel for a tooth division. It is to be noticed, that the lock lever 164 is so arranged that it acts upon the projection 165 upon the free end of the transfer lever 159 as shown in Fig. 20, in which the position of the counting mechanism and the position of the operative parts for the stepping of the tens toward the end of the return stroke of the crank handle and the resulting tens progression are apparent. The operation is the same for subtraction, excepting that the pin 157 on the wheel 105 co-acts with the lug 161 on the transfer lever.

The racks 96, after the completion of a carry-over, must be returned to normal position before conducting a new addition. For this purpose the yoke 171 is brought into operation by means of the draw bar 173 in the following manner.

During the next following forward movement of the crank lever, the setting devices 36 are released to set themselves to correspond to the depressed type keys. In normal position the draw bar 173 is located in the position shown in Fig. 17, in which the pin 177 cannot engage with the hook 174, but passes thereover, while the pin 178 upon the rear side of the anchor-shaped lever 176 becomes engaged with the hook 175 upon the downward movement of the latter. This happens toward the end of the forward movement of the crank C, whereby the draw bar 173 is drawn downwardly and brings the yoke bar 171 into operative engagement with the lock levers 164 and presses their left ends down. The result thereof is to bring the lugs 167 on the bars 166 again into the path of the pins 170 on the racks and the said racks are arrested in normal position upon their rearward movement, in case a new computing operation does not take place. In the subtracting process the above-described operations take place in corresponding manner. For the drawing of totals and subtotals, it is possible however, as heretofore, to take advantage of the period of time during which the hand crank is being moved backward to return the racks to their normal position, since in this case, the counting mechanism is already in engagement with the racks upon the forward movement of the crank lever, whereas in the latter for the totalizing operation all the racks upon engagement with the counting mechanism must be in normal position, if the printing of the proper result is to be effected. For this purpose the yoke or frame 190, 191 is provided, which operates in the following manner for drawing the final results.

When the total key 7 is thrown over, the rod 129 is moved from left to right. The three-armed lever 128 is thereby swung so that its lower arm 184 is carried to the right, (Fig. 23) while its horizontal or central arm will be swung downwardly and the bell crank yoke or frame 190 through the medium of the draw bar 186, the bell crank lever 188, the link 195 and the link 194 will be carried from the position shown in Figs. 19 and 20 into the position shown in Figs. 21 and 22. That is, the pin carried by the arm 192 of the bell crank 190 will be moved into the lower branch of the right-angled slot 193 in the end of said link 194. If the control device 100 is now turned to the right during the forward movement of the crank handle, the friction roller 198 of the bell crank lever 196 will ride upwardly over the periphery of the control device, whereby the bell crank lever 196 is turned counter-clockwise upon its pivot 197. By this means the link 194 is drawn downwardly and turns far enough to the right, through the medium of the arm 192 of the yoke 190 so that the partly actuated racks 96 can be returned to their normal positions by means of the frame bar 191. This must occur before the counting mechanism is thrown into engagement with the racks. In Fig. 21 the position of the individual parts is shown, which they assume after the resulting computing operation and after the movement of the total key 7 while Fig. 22 shows how the racks 96 are returned to its normal position, when the counting mechanism is brought into engagement with the racks. While the racks are being returned to their normal position, the bars 166 are being depressed in the following manner. Upon the actuation of the total key 7 the lever 182 (Fig. 17) is partly turned to the right through the medium of the parts 129, 128, 185 and 183, whereby the draw bar 173 which bears against the pin 181 of the lever 182 through the action of the spring 179 takes up the motion of said lever 182. Through this means the hook 174 is brought into the path of the pin 177 and the draw bar is in like manner moved downwardly at the beginning of the forward stroke of the crank handle, whereby as has been already described, the rod 166 is depressed. If the bar 166 should be brought into its normal position, the pin 177 will be disengaged from the inclined faces of the hook 174 through the medium of the bar 180, Fig. 17 and the draw bar 173 will be quickly drawn to its upward position by means of the spring 179. In order that the draw bar 173 may not be drawn downwardly again during the further movement of the lever 176, which must continue until the end of the forward stroke of the crank lever by the engagement of the pin 178 upon the back part of the rear hook 175 of the draw bar 173, the said rear hook is provided with a recess portion in which the pin 178 projects idly.

Finally, it is to be noted that the bell crank lever 188 is turned at each computing operation of the machine by means of the control segment 100, but that this rotation generally is without operative effect, and that the upper part of the right-angled slot 193 can slide over the pin of the arm 192 without imparting any motion to the yoke or frame 190, 191, while upon drawing a result or total by operating the total key 7, motion is communicated to the yoke or frame by the position of the link bar 194, as shown in Figs. 21 and 22, by means of the bell crank lever 188.

In taking a total, the key 7, is moved rearwardly, in the direction of the arrow, Fig. 23, but without disturbing the pawl 132. Thus, both levers 7 and 133 remain in fixed coupled relation, and both bars or rods 134 and 129 are shifted rearward. For the purpose of taking totals or for printing, it is necessary for the counting mechanism to be set in engagement with the racks 96, in order to bring them into locked position, but they must also be returned to normal after the forward stroke of the crank and at the end of the return stroke of the latter. By the movement of the bar 129, the three-armed lever 128 is rotated and draws the regulating plate 125 which is pivoted on the pin 127 downwardly. Thus, while the adjustable pin 122 is moved downwardly in its slot in the arm 120 of the bell crank lever 120, 121 the lug or projection 144 on said plate 125 strikes against the pin 143 on the arm 121 of the bell crank, and swings the latter downwardly, whereby the shaft 113 is moved to the left, Fig. 25, through the medium of the bell crank lever 123, and at the same time roller 116 is drawn out of the slot 118 and roller 115 is projected into the slot 119, Fig. 26. If the crank C is now moved forwardly, then the cam slot 119 comes directly into play and the counting mechanism is actuated through the variation in direction of the slot, whereby it guides the roller 115 to swing the counting mechanism. The racks 96 turn downwardly after the release of their locking mechanism through the action of the crank handle, and are meshed with the counting wheels 106, turning therewith until the counting wheels are again brought into their neutral positions in which they are again locked against further rotation. By the means which has moved the rod 134 to the right during the operation of the total key, the lever 135 is swung to the right and the pin 136 (Fig. 23) operates in the slot 137 formed in the lever 138, whereby the latter and the two armed lever 140 are raised and move into position to coact with the lug or pin 142 on the arm 141, which latter has been swung leftward and downward by the movement of the crank C. At the end of the forward movement of the crank C, the pin 142 of the swinging arm 141 strikes against the left arm of the lever 140, whereby the latter is depressed, and thereby the right arm of said lever 140 is raised and presses against the arm 121 and swings the bell crank upwardly, and thus the shaft 113 with the arm 114 moves to the right (Fig. 26) and roller 115 runs out of the slot 119, while roller 116 enters into engagement with the slot 118. For this purpose, it is necessary that the pin 143 should be yieldably mounted in suitable position, so that it can be caused to pass by the projection 144 which is rigid in its position. For the reason that the roller 115 rides upwardly over the left hand portion of the upwardly rising section of the slot 119, the counting mechanism is first taken out of engagement with the racks 96. During the rearward action of the crank C, the segments 99 and 100 operate idly, while the total key, which is locked in its operating position, is released toward the end of the return stroke of the crank and returns to normal position by means of the spring 7ᵃ (Fig. 3).

For the purpose of obtaining subtotals, it is necessary that the counting mechanism be prevented from returning to neutral position after the printing of the subtotals, and that it be set again to the same sum so that further addition can be made thereto. This must be arranged so that the counting mechanism can be retained in engagement with the racks 96 during the forward and backward actions of the crank C. If the subtotal is now taken, then the total key 7 is turned in the same manner as for a final total, except that the pawl 132 is released or pulled toward the hand grip 131. By this means the lever 133 is uncoupled from the total key, so that it is not carried along and the rod 134 as well as the swinging lever 135 does not receive any movement, and, furthermore, the lever 140 is not lifted into the path of the projection 142. For the rest of the operations, the counting mechanism is actuated by means of the key 7, so that at the beginning of any operative movement of the crank C, it stands in engagement with the racks 96, and the latter, together with the key 7 now stands in the same position as heretofore, so that the sum or total can be printed off and the counting mechanism returned to neutral. If the lever 140 does not come into operation with the bell crank lever 120, 121, toward the end of the forward movement of the crank, the counting mechanism which was thrown out of operative engagement toward the end of the forward stroke, remains in under the control of the cam slot 119 and remains ready to be set during the following backward action of the crank. Since by that means the counting wheels are again turned back out of neutral position into the former position and show the printed subtotal, then the parts are in position to have the additions or subtractions continued as though no total had been taken. Toward the end of the return movement of the crank, the total key is returned by its spring 7ª to its normal position, and thereby the adjustable pin 122 through the medium of the parts 129, 128 and 7, is raised and comes into the control of the lug 200. Through this the bell crank lever 120, 121 is swung upwardly, the shaft 113 with the arm 114 is also carried to the left and the roller 116 is withdrawn from the slot 118, the roller 115 again enters the cam slot 119 and the machine is ready for further operations. For subtracting, the described operations occur in the same manner, after the proper setting of the counting mechanism to reduce the total.

*Printing mechanism.*

The left-hand arms 37 of the setting devices 36 are provided with toothed segments 205 (Fig. 13), which mesh with the rack bars 206 formed on the lower ends of the type carriers or type bars 207. Said type bars 207 are movable vertically up and down on guide pins 208 and in guide-slots formed in the top of the machine casing, and carry on their upper ends, in a housing or frame like structure 209, the type 210, which range from 0—9, and correspond in number to the rows of keys 6. Under the influence of the hammers 211, and in opposition to springs 212, the type bars are adapted to operate against the printing roller or platen D. In their normal positions, the hammers 211 are locked in engagement with the hooked ends 213 of the two armed levers 214, the latter being mounted to rotate on a shaft 215, to which are connected the spiral springs 216, the opposite ends of the latter being connected to hooked elements on the levers 214. On the free ends or arms of the levers 214 are loosely mounted the bars 217, which are pressed toward the type-bars 207 by the leaf-springs 218. The type-bars or carriers are provided with notches 219, in which the projections or lugs 220 of the bars 217 enter, and the bars 217 are also provided with the rearwardly projecting lugs 221 which are placed in position to operatively connect with the cross-piece 222 of a yoke. One side arm 223 of the yoke forms one of the arms of a bell-crank lever, whereby the yoke is adapted to be swung or oscillated. On the free end of the bell-crank lever is pivotally connected a straight drawbar 224, which is slotted at its opposite end and is also provided with an upwardly projecting lug 225.

The bars 217 are provided on their lower ends with the transversely projecting lugs or ears 226, each of which engages over the next adjacent bar 217, whereby the bars are connected together in such a manner that each of the bars suitably raised for the higher counting position controls the bars in a lower position. The ears or lugs 226 are displaced or staggered in vertical alinement so that they can all lie in the same plane. In order to permit the machine to be split, the lugs 226 in certain instances are not constructed in one piece or rigidly with the bars 217, but are formed as small projections on the ends of small bell-crank levers which constitute the pawls or latches 227. The pawls 227, having the lugs or tips 228, are pivotally mounted on the proper bars 217 and are held in normal position by means of springs 227ª. Behind the bars 217 (the left of said bars in Fig. 13), is a comb-like plate 229 (Fig. 15), slidably mounted upon a suitable guide-plate 230. The comb-like plate 229 is adjustable by means of a rotatable bar 231, which is centrally pivoted on the base plate of the machine. Said bar 231 has two upwardly projected arms, one of which engages with a downward projection on the plate 229 (Figs. 13 and 16), while the other is connected to the thumb-nut 232 on the key-board of the machine, and is controlled thereby, a suitable scale being provided for indicating the degree of adjustment of the plate 229. In order to positively lock the type-bars 207 in the printing positions which they take at each computing operation, a locking apparatus is provided. Upon the main shaft 1 is secured an arm 233 (Fig. 23) on which a draw-bar 234 is pivoted. The opposite end of said draw-bar 234 is pivotally secured to a lever 235, mounted on a shaft 236, extending across the machine frame. Upon the same shaft 236 is mounted a second lever 237, whose free forked end engages a pin 238 of a cam segment 239. Said cam segment 239 is freely rotatable upon a pin 240, mounted upon a fixed part of the machine and guides a lever 241 by means of a friction roller 242, which is provided on said lever and operates within the cam slot of said segment 239. The lever 231 is carried upon a stub shaft 243, upon which latter is also mounted a locking pawl 244, which is adapted to project between the teeth 206 of a type bar 207. During the forward stroke of the crank C, the arm 233 upon the main shaft 1 is turned in the direction of the arrow, and the bar 234 is actuated toward the left in Fig. 23. By this means the arms 235 and 237 upon the shaft 236 are turned at the same time toward the left, whereby the cam segment 239 is actuated in the swinging movement toward the left around pivotal point 240. Next, the left hand concentric portion of this slot directs the guide roller 242, which must thereafter pass through the inclined part of the slot downwardly into the right-hand concentric section of said slot. By this means the lever 241 upon which the friction roller 242 is carried and which is mounted upon the shaft 243, is swung downwardly and the locking pawl 244 is brought into engagement with the rack 206. The foregoing takes place at the end of the forward stroke of the crank C, and effects on the one hand an exact positioning of the type in the printing position, and on the other hand acts as a positive lock for the gear segments 205 and setting devices 36 in their proper position during the printing and other operations. Soon after the beginning of the return stroke of the crank C, the locking pawl 244 is positively disengaged in the reverse manner.

The operation of the printing mechanism is as follows: During the downward movement of the setting devices the toothed segments 205 swing upwardly and raise the rack-bars 206, and therewith, the type-bars or carriers 207, until type indicated by the keys are placed in printing position. All of the type-carriers which are not under the control of a depressed key are raised until the zero is placed in printing position, the slide-bars 34 automatically taking a zero position as hereinbefore described.

After the type bars are set, the forward movement of the crank continues until the motion communicated to the shaft 2 turns the arm 234ª thereon in the direction of the arrow (Fig. 13) until the lug 234 abuts the upwardly projecting lug 225 on the bar 224, and moves the latter to the right. The movement of the bar 224 is transferred to the yoke 222, 223 through the bell-crank lever 223, and the cross-piece 222 is depressed. When the type carriers have been sufficiently elevated, (this is the case with all the type except the zeros), the oblique faces of the notches 219, ride over the lugs 220 of the bars 217, whereby the bars are swung outwardly and come within operating range of the cross-piece 222, so that they will be carried downwardly with the latter on its downward movement. If the bars 217 are pushed downwardly, then the levers 214 swing around their axes, until the hooked lugs 212 are released from the hammers 211. The latter are then actuated by the springs 216, as shown in dotted lines in Fig. 13 and strike upon the type which have been placed in printing position. By means of a bar 235, which may be operated by means of any primary or secondary operative movement of the machine, the hammers can be returned to normal position.

The cut-out portion or notch 219 in the type-carriers is so designed, that a certain free play is permitted before the oblique sides begin to operate on the bars 217. The free play is of such extent, that the type-carriers, which are only carried upwardly such a distance as to permit their zero-type to be placed in printing position, do not perform any work on the bars 217. Furthermore, in this position of the type-carriers, the hammers 211 are not adapted to be released. The automatic printing of intermediate zeros or zeros of a lower order in a number of several digits is carried out when, as above described, the ears or lugs 226 of the bars 217 couple the bars 217 of next lower position or order therewith so that such bars 217 of lower order are given the proper motion for releasing the hammers 211.

If the machine is divided, as for column work, then the zeros at the right of the left hand column are not automatically printed when the left hand column is printed. In the example chosen for illustration the machine is divided at three points and the divisions are made on the third, seventh and eleventh lines, so that there are four columns for use. At the different division points, the independent lugs 226 are set by means of the pawls or latches 227 to which the lugs are attached as above described. If the machine is not to be divided, then the plate 229 is so placed that the lugs 228 of the corresponding pawls or latches 227 stand opposite the recesses 236 (Fig. 15) in the plate 229. If, on the other hand, the machine is divided into four columns, then the plate 229 must be so positioned, that the lugs 228 of the corresponding pawls 227 stand opposite the teeth or projections 237. If the bars 217 are swung outwardly, the latches or pawls 227 strike against the teeth or projections 237, whereby the latches or pawls are pressed toward the right and their carrying lugs 226 are moved far enough downwardly that they are no longer in engagement with the bars 217 of the next lower position, and furthermore, do not carry the latter by reason of the greater outward swing. As a consequence, there is found an interruption of the carrying on of the bars of the next lower order at the point of division, so that the columns are separated from one another and when a column is printed, there are no zeros automatically printed to the right thereof. It will be noted that the latches 227 are mounted on the bars 217, and so always have the same relative vertical movement as the latter and the lugs 228 bear against the same points on their respective bars. Thus the only movement which can disturb the normal locked relation between a lug 228 and a bar 217 is a rearward movement of the latter, at which time the latch 227 abuts against a tooth 237 (Fig. 15) and can have a sliding movement thereagainst to accommodate the vertical movement of its proper bar 217.

Of course other combinations than the example given can be produced by a different combination of teeth and notches on the plate 229, and different combinations of columns can be formed, without departing from the present invention.

What I claim as my invention is:

1. A counting mechanism for computing machines, comprising in combination, a plurality of operating elements adapted to be released into set positions, a series of counting wheels adapted to be moved into and out of contact with said operating elements, means for shifting said operating elements independently of their release movement to effect carry-overs, means carried by said counting wheels for controlling the actuation of said operating elements in their independent shifting movement, means to restore said operating elements to normal position at the beginning of the following cycle of operations before a new computation is started, and a further means to restore said operating elements when a total is to be taken.

2. A key board for computing machines, comprising in combination, a plurality of columns of keys and a set of pivotally mounted locking bars, one individual to each column of keys, each bar adapted to be oscillated about its pivots transversely of the corresponding column to lock a depressed key therein, and movable longitudinally to lock the remaining keys in normal position.

3. A key board for computing machines comprising in combination, a plurality of columns of keys, and locking mechanism for locking said keys, said locking mechanism comprising a longitudinally movable frame and a set of locking bars, one individual to each column of keys carried by said frame, said bars being movable transversely of the key-board and relatively to said frame to lock the keys in their depressed positions and being movable with the frame longitudinally of the key-board to lock the remaining keys in their elevated positions during operation of the machine.

4. A key board for computing machines, comprising in combination, a plurality of columns of keys adapted to be depressed in a key board housing, slide-bars controlled by said keys for setting the type and computing mechanism, latch-bars for locking said slide-bars in position, a special key, a transverse bar having notches normally overlying said latch-bars, and means operated by said special key for moving said bar endwise to bring its notches out of alinement with said latch-bars, and means for thereafter moving said notched bar laterally to release all of said latch-bars simultaneously.

5. A key board for computing machines, comprising in combination, a plurality of columns of keys adapted to be depressed in a key board housing, slide-bars controlled by said keys for setting the type and computing mechanism, latch-bars for locking said slide-bars in position, a total key for releasing said latch-bars, bars for locking said slide-bars in separate sets against movement after release by said total key, and means for operating said bars individually, whereby any set of slide-bars can be released independently of another set to totalize a column.

6. A key board for computing machines, comprising in combination, a plurality of columns of keys adapted to be depressed in a key board housing, locking bars mounted adjacent the spindles of said keys, means carried by the key spindles adapted to be engaged by said locking bars for holding said keys in depressed position, a release bar for releasing said locking bars, said release bar being composed of a plurality of sections, a coupling normally connecting said release bar sections, and means for disconnecting said coupling, whereby said locking bars may be released in groups.

7. A key board for computing machines, comprising in combination, a plurality of columns of keys adapted to be depressed in a key board housing, locking bars mounted adjacent the spindles of said keys, means carried by the key spindles adapted to be engaged by said locking bars for holding said keys in depressed position, a release bar for releasing said locking bars, means for actuating said release bar, a repeat key, a lever carried by said release bar and operatively engaging said repeat key, and means normally coupling said lever and said release-bar actuating means, said coupling means being so arranged that when said repeating key is operated, said release-bar actuating means will be disengaged from said release bar.

8. A key board for computing machines comprising in combination, a plurality of columns of keys adapted to be depressed in a key board housing, locking bars mounted adjacent the spindles of said keys, means carried by the key spindles adapted to be engaged by said locking bars for holding said keys in depressed position, a movable frame carrying all of said locking bars, a bell-crank lever for reciprocating said frame to cause all of said undepressed keys to be locked by said locking bars, and a divided disk adapted to be rotated to actuate said bell-crank lever, the divisions of said disk being coupled together to move rigidly in one direction to move said frame forward and to break their connection on the return stroke to permit the said frame to return to normal position before the end of said return stroke.

9. A key board for computing machines comprising in combination, a plurality of columns of keys, and locking mechanism for said keys, said locking mechanism consisting of a frame movable longitudinally of the key-board and a series of locking bars one for each column of keys carried by said frame and mounted to swing individually in one direction relatively to said frame into locking engagement with the depressed keys and to move collectively with said frame in another direction to lock all other keys in normal position.

10. A key board for computing machines comprising in combination, a plurality of columns of keys, and locking mechanism for said keys, said locking mechanism comprising a frame movable longitudinally of the key board, and a plurality of longitudinally pivoted lock bars, one individual to each column of keys, mounted to be swung transversely into engagement with the depressed keys and to move endwise collectively with said frame to lock the remaining keys in normal position.

11. A key board for computing machines comprising in combination, a plurality of columns of keys adapted to be depressed in a key board housing, locking bars mounted adjacent the spindles of said keys, means carried by the key spindles adapted to be engaged by said locking bars for holding the depressed keys against return, a frame supporting said locking bars and adapted to be moved longitudinally of the key board to shift said locking bars endwise so as to lock all keys in position during the working stroke of the crank of the machine and means for releasing all the locking bars at the end of the return stroke of said crank.

12. Controlling mechanism for the counting mechanism of computing machines, comprising in combination, a plurality of gear segments, a shaft whereon they are mounted, a corresponding plurality of counting wheels mounted to oscillate into and out of engagement with said gear segments, means for operating said gear segments to actuate the counting wheels, and controlling means mounted on the same shaft as said gear segments, said controlling means being operatively connected to effect the positive oscillation of the counting wheels for all computing operations of the same.

13. Controlling mechanism for the counting mechanism of computing machines, comprising in combination, a plurality of gear segments, a shaft whereon they are mounted, a corresponding plurality of counting wheels adapted to be brought into and out of engagement with the gear segments, a pair of controlling disks mounted on the same shaft as said gear segments, a hand crank for actuating said gear segments and means interposed between said controlling disks and said hand crank for enabling the latter to control the engagement of said computing wheels with the gear segments for all computing operations in the machine.

14. Controlling mechanism for the counting mechanism of computing machines, comprising in combination, a series of gear segments, a shaft whereon they are mounted, a corresponding series of counting wheels adapted to be brought into and out of engagement with said gear segments, a pair of controlling disks mounted on the same shaft as said gear segments, a lever carried by the above-mentioned shaft and operatively connected to said counting wheels, and means interposed between said controlling disks and said lever whereby the former positively control the position of the counting wheels relative to the gear segments for all computing operations.

15. Controlling mechanism for the counting mechanism of computing machines, comprising in combination, a series of gear segments, a shaft whereon they are mounted, a corresponding series of counting wheels adapted to be brought into and out of engagement with said gear segments, a pair of controlling disks mounted on the same shaft as said gear segments, a lever carried by said shaft and operatively connected with said counting wheels, means interposed between said controlling disks and said lever whereby the former positively control the position of the counting wheels relative to said segments for all computing operations, friction rollers adapted to be controlled by said lever and operating in slots formed in said controlling disks, said cam slots being so formed that the lever is variously actuated for different computing operations by said disks, and means for actuating said disks positively.

16. In a computing machine, the combination of a plurality of columns of keys; slide-bars controlled by said keys for setting the type and computing mechanism; latches for locking said slide-bars in position; a special key; a transverse bar having notches normally overlying said latches; and a pivoted member connected to said notched bar and having a cam portion engaging said special key, whereby actuation of the latter will cam said pivoted member outward and pull said notched bar endwise so as to bring its notches out of alinement with said latches.

17. In a computing machine, the combination of a plurality of columns of keys; slide-bars controlled by said keys for setting the type and computing mechanism; latches for locking said slide-bars in position; a special key; a transverse bar having notches normally overlying said latches; a pivoted member connected to said notched bar and having a cam portion engaging said special key, whereby actuation of the latter will cam said pivoted member outward and pull said notched bar endwise so as to bring its notches out of alinement with said latches; and means for thereafter moving said notched bar laterally to release all of said latches simultaneously.

18. In a computing machine, the combination of a plurality of columns of keys; slide-bars controlled by said keys for setting the type and computing mechanism; latches for locking said slide-bars in position; a total key for releasing said latches; rocking members for locking said slide-bars in two separate groups against movement after release by said total key; and a key individual to each group of rocking members to effect engagement thereof with the corresponding group of slide-bars.

19. In a computing machine, the combination of a plurality of columns of keys; slide-bars controlled by said keys for setting the type and computing mechanism, said slides being provided with projections arranged in a transverse row; latches for locking said slide-bars in position; a total key for releasing said latches; two groups of rocking members engageable with the projections on said slide-bars to lock the latter against movement after release by said total key; and means for operating either group of rocking members independently of the other.

20. In a computing machine, the combination of a plurality of columns of keys, each having a lug provided with a slotted, inclined edge; a set of locking bars, one individual to each column of keys; said bars being mounted for rocking movement about their longitudinal axes and having, each, a series of slots normally alining with the lugs on the corresponding column of keys, so that upon the depression of a key the associated bar will be initially cammed outward by the inclined edge of the lug on said key to ride along said edge until reaching the notch therein, and will thereupon enter said notch; and means for thereafter shifting the bars endwise, to bring the notches in said bars out of alinement with the lugs on said keys, thereby to lock the depressed keys against return and the remaining keys in normal position.

21. In a computing machine, the combination of a plurality of columns of keys, each provided with a pair of spaced lugs, one of which is formed with a slotted, inclined edge; a set of locking bars, one individual to each column of keys; said bars being mounted for rocking movement about their longitudinal axes and having, each, a series of pairs of slots normally alining with the pairs of lugs on the corresponding column of keys, so that upon the depression of a key the lugs thereon will move through the adjacent slots in the associated bar, and the latter will be initially cammed down by the lug having the inclined edge to ride along the same until reaching the notch therein, and will thereupon enter said notch; and means for thereafter shifting the bars endwise, to bring the notches in said bars out of alinement with the lugs on said keys, thereby to lock the depressed keys against return by means of their slotted lugs, and to lock the remaining keys in normal position by means of their unslotted lugs.

22. In a computing machine, the combination of a plurality of columns of keys, each having a lug provided with a slotted, inclined edge; and a set of locking bars, one individual to each column of keys; said bars being mounted for rocking movement about their longitudinal axes and having, each, a series of slots normally alining with the lugs on the corresponding column of keys, so that upon the depression of a key the associated bar will be initially cammed outward by the inclined edge of the lug on said key to ride along said edge until reaching the notch therein, and will thereupon enter said notch and be retained thereby in depressed position.

In testimony whereof I affix my signature.

JOHN EMIL WILLIAM GREVE.